(12) United States Patent
Rhodes et al.

(10) Patent No.: US 8,165,971 B2
(45) Date of Patent: Apr. 24, 2012

(54) GENERATING SIMULATED NEURAL CIRCUITS IN A VOXEL SPACE

(75) Inventors: Paul A. Rhodes, Palm Beach, FL (US); Brian Seisho Taba, Cupertino, CA (US)

(73) Assignee: Evolved Machines, Inc., West Palm Beach, FL (US)

( * ) Notice: Subject to any disclaimer, the term of this patent is extended or adjusted under 35 U.S.C. 154(b) by 322 days.

(21) Appl. No.: 12/049,931

(22) Filed: Mar. 17, 2008

(65) Prior Publication Data

US 2008/0262813 A1    Oct. 23, 2008

Related U.S. Application Data

(60) Provisional application No. 60/895,334, filed on Mar. 16, 2007, provisional application No. 60/895,627, filed on Mar. 19, 2007.

(51) Int. Cl.
*G06N 5/00* (2006.01)

(52) U.S. Cl. ........................................... 706/10; 706/45

(58) Field of Classification Search .................... 706/10, 706/45
See application file for complete search history.

(56) References Cited

OTHER PUBLICATIONS

Franks, et al, Complexity of Calcium Signaling in Synaptic Spines, BioEssays 24, 2002, pp. 1130-1144.*

* cited by examiner

*Primary Examiner* — Wilbert L Starks
(74) *Attorney, Agent, or Firm* — Fish & Richardson P.C.

(57) ABSTRACT

A three-dimensional voxel space is generated in which to generate a simulated neural circuit. The voxel space includes a plurality of voxels that store localized information. After the voxel space is generated, a plurality of simulated branched neurons, each of which has one or more input and/or output branches that occupy at least one of the voxels, are embedded in the voxel space. One or more of the branches of the plurality of simulated neurons then are generated in a manner that changes the voxels occupied by the grown branches, and the localized information stored in the voxels is updated to reflect the changes in the voxels occupied by the grown branches.

27 Claims, 26 Drawing Sheets

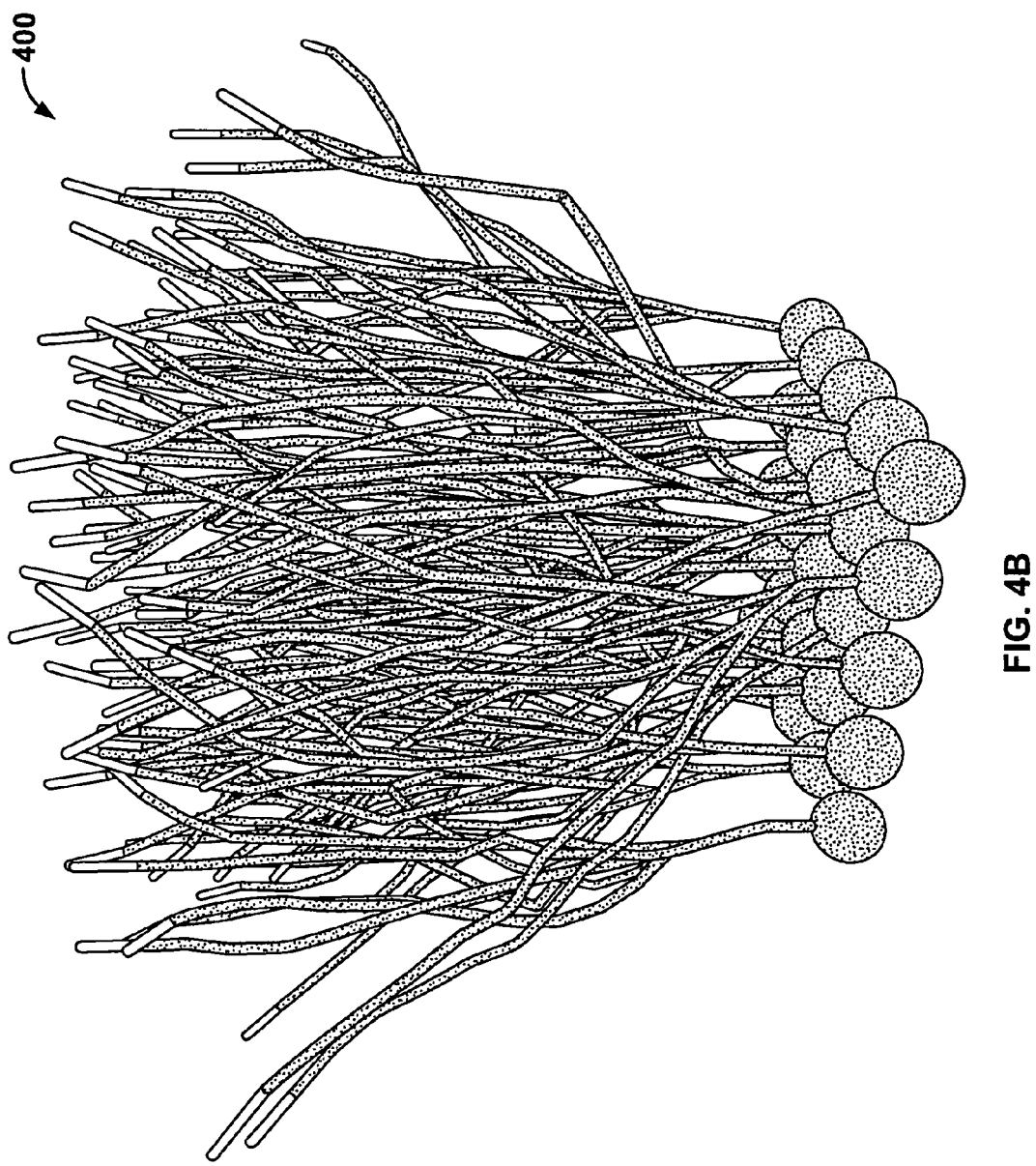

US 8,165,971 B2

GENERATING SIMULATED NEURAL CIRCUITS IN A VOXEL SPACE

CROSS-REFERENCE TO RELATED APPLICATIONS

The present application claims priority from U.S. Provisional Patent Application Ser. No. 60/895,334, filed on Mar. 16, 2007 and entitled "Activity Dependent Growth of Synthetic Neural Circuits" and from U.S. Provisional Patent Application Ser. No. 60/895,627, filed on Mar. 19, 2007 and entitled "Activity Dependent Growth of Synthetic Neural Circuits," both of which are incorporated herein by reference in their entirety.

TECHNICAL FIELD

This disclosure relates to generating simulated neural circuits.

BACKGROUND

Attempts have been made to create simulated neural circuits that include properties of biological neural circuits.

Biological neural circuits are made up of an incredibly dense meshwork of numerous, complex, tree-like units called "neurons." Each neuron makes at least thousands of connections with other neurons. It is at these connections or "synapses" that information is transferred between the neurons. The pattern of these connections, that is the wiring of the neural circuit, in large part defines the circuit's function. The sensory performance of biological organisms makes it clear that such circuitry is capable of very sophisticated and powerful processing. However, unlike conventional electronic circuits, this extraordinary meshwork wires itself. That is to say, the pattern of synaptic connections in the neural circuit is not determined a priori with an explicitly encoded point-to-point wiring diagram, but instead is formed through mechanisms that allow self-organization of the circuit as part of the functioning of the neurons. The pattern of wiring embeds information imparted both genetically as well as that learned by exposure to the sensory environment. This process of wiring may continue throughout the life of the organism. All real neural circuits wire themselves. Therefore, in seeking to create simulated neural circuits which emulate some of the function of these biological circuits, it may be advantageous to generate simulated circuits that also wire themselves. After such simulated circuits have been generated, they subsequently may be implemented and fabricated, for example, as integrated circuits, for real-life applications.

SUMMARY

A simulated neural circuit includes neural elements. Like biological neurons that include dendritic trees as inputs and axons as outputs, each neural element may include inputs in the form of simulated dendritic trees and outputs in the form of simulated axons. The simulated dendritic trees of some neural elements and the simulated axons of other neural elements are wired together as the simulated neural circuit is generated.

A three-dimensional voxel space includes individual three-dimensional voxels that each represent a small region of the voxel space. The voxel space may be used as a data structure to model the environment in which a simulated neural circuit is generated. Each voxel may be used to maintain information about the local environment in the region of space represented by the voxel, as well as information about which components of which neural elements occupy the region. This local information may be used to influence the generation of the simulated neural circuit by supporting the simulation of local interactions between the components of individual neural elements, as well as local interactions between an individual neural element and the environment in which the neural circuit is generated. The local information provided by the voxels also may be used in implementing local rules that guide the forming, stabilizing and disintegration of connections between the components of individual neural elements. For example, each voxel may include a list of the components, such as the input dendritic branches or the output axons, of neural elements that are present at the voxel. When a new local connection is desired to a given input branch residing in a given voxel from some nearby axon, the list of axon segments in that voxel, and, if desired, the list of axon segments in neighboring voxels, immediately serves as a set of candidate inputs, which provides an elegant way to "find" candidate inputs suitably proximate to the receiving neural branch.

A three-dimensional voxel space enables the efficient storage and processing of localized data. Therefore, due to the significant influence that local conditions exert on the generation of a simulated neural circuit, a three-dimensional voxel space may be a particularly useful data structure for modeling the environment in which a simulated neural circuit is generated.

Particular aspects of the general concepts of using a voxel space in the generation of simulated neural circuits are described below.

In one aspect, a three-dimensional voxel space is generated in which to generate a simulated neural circuit. The voxel space includes voxels that store localized information. After the voxel space is generated, simulated branched neurons, each of which has one or more input and/or output branches that occupy at least one of the voxels, are embedded in the voxel space. One or more of the branches of the simulated neurons then are generated in a manner that changes the voxels occupied by the generated branches, and the localized information stored in the voxels is updated to reflect the changes in the voxels occupied by the generated branches.

Implementations may include one or more of the following features. For example, the localized information stored in the voxels may include branch density information, and, after the branches are generated, the branch density information stored in the voxels may be updated to reflect the changes in the voxels occupied by the generated branches. In such implementations, the branch density information stored in the voxels may be used to influence the generation of the branches. For example, candidate segments to add to an individual branch may be generated, and one or more voxels that would be occupied by each candidate segment if added to the branch may be identified. Then, the branch density information stored in the voxels that would be occupied by each candidate segment if added to the branch may be accessed, and one of the candidate segments may be selected to add to the branch based on the accessed branch density information. For instance, the candidate segments that would occupy one of the voxels that is least densely occupied by other branches may be selected as the candidate segment to add to the branch. Finally, the selected candidate segment may be added to the branch, and the branch density information in the voxels occupied by the added segment may be updated to reflect the occupation of the voxels by the added segment.

In some implementations, a spatial pattern of a simulated branch attractant may be generated in the voxel space, and simulated branch attractant information may be stored in the voxels such that the simulated branch attractant information stored in each voxel reflects a concentration of the simulated branch attractant in each voxel. In such implementations, the simulated branch attractant information stored in the voxels may be used to influence the generation of the branches. For example, candidate segments to add to a branch may be generated, and one or more voxels that would be occupied by each candidate segment if added to the branch may be identified. Then, the simulated branch attractant information stored in the voxels that would be occupied by each candidate voxel if added to the branch may be accessed, and one of the candidate segments to add to the branch may be selected based on the accessed simulated branch attractant information. For instance, the candidate segment that would occupy one of the voxels having the highest concentration of the simulated branch attractant may be selected as the segment to add to the branch. Finally, the selected candidate segment may be added to the branch.

In additional or alternative implementations, a spatial pattern of a simulated branch repellant may be generated in the voxel space, and simulated branch repellant information may be stored in the voxels such that the simulated branch repellant information stored in each voxel reflects a concentration of the simulated branch repellant in each voxel. In such implementations, the simulated branch repellant information stored in the voxels may be used to influence the generation of the branches. For example, a plurality of candidate segments to add to an individual branch may be generated, and the one or more voxels that would be occupied by each candidate segment if added to the branch may be identified. Then, the simulated branch repellant information stored in the voxels that would be occupied by each candidate voxel if added to the branch may be accessed, and one of the candidate segments may be selected to add to the branch based on the accessed simulated branch repellant information. For instance, the candidate segment that would occupy one of the voxels having the lowest concentration of the simulated branch repellant may be selected as the segment to add to the branch. Finally, the selected candidate segment may be added to the branch.

Neural element density information also may be stored in the voxels such that the neural element density information reflects densities of different types of neural elements occupying each voxel. In addition, a spatial pattern of one or more simulated chemotropic substances may be generated in the voxel space and simulated chemotropic substance information may be stored in the voxels such that the simulated chemotropic substance information stored in each voxel reflects concentrations of the simulated chemotropic substances in each voxel.

The branches of the simulated neurons may include branches of different types and the different types of branches may have different affinities for the simulated chemotropic substances and for different types of neural elements. As a result, the generation of individual branches may be influenced by their affinities for the simulated chemotropic substances and the different types of neural elements. For example, a plurality of candidate segments to add to an individual branch may be generated, and the one or more voxels that would be occupied by each candidate segment if added to the branch may be identified.

The simulated chemotropic substance information and the neural element density information stored in the voxels that would be occupied by each candidate voxel if added to the branch may be accessed, and one of the candidate segments to add to the branch may be selected based on the accessed simulated chemotropic substance information and the accessed neural element density information. Finally, the selected candidate segment may be added to the branch. The process of selecting one of the candidate segments to add to the branch may include penalizing candidate segments that would extend into voxels occupied by neural elements for which the branch has a repulsive affinity, penalizing candidate segments that would extend into voxels having concentrations of simulated chemotropic substances for which the branch has a repulsive affinity, rewarding candidate segments that would extend into voxels occupied by neural elements for which the branch has an attractive affinity, and rewarding candidate segments that would extend into voxels having concentrations of simulated chemotropic substances for which the branch has an attractive affinity.

In additional or alternative implementations, a first array of simulated branched neurons having input branches that occupy at least one voxel and a second array of simulated branched neurons that have output branches that occupy at least one voxel may be embedded in the voxel space. In such implementations, one or more of the output branches of the simulated neurons of the second array may be generated in a manner that changes the voxels occupied by the generated output branches, and the localized information stored in the voxels may be updated to reflect the changes in the voxels occupied by the generated output branches.

The various aspects, implementations, and features may be implemented using, for example, one or more of a method, an apparatus, a system, tool, or processing device for performing a method, a program or other set of instructions, an apparatus that includes a program or a set of instructions, and a computer program embodied in a tangible computer readable medium. The tangible computer readable medium may include, for example, instructions, software, images, and other data.

The details of one or more implementations are set forth in the accompanying drawings and the description below. Other features will be apparent from the description and the drawings, and the claims.

DESCRIPTION OF DRAWINGS

FIGS. 4a and 4b are block diagrams of an array of simulated neurons.

FIGS. 7b-7d are block diagrams of a simulated neural circuit formed by generating and connecting the output axons of the output array of simulated neurons and the input dendrites of the input array of simulated neurons of FIG. 7a.

DETAILED DESCRIPTION

Figure 1C:
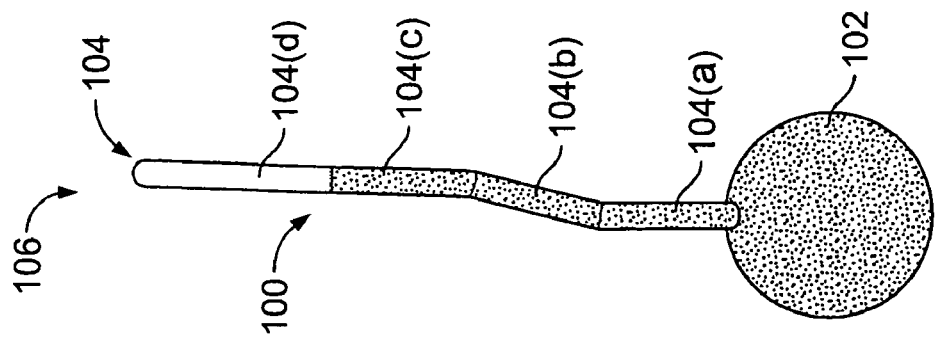
FIGS. 1a-1h are block diagrams of a simulated neuron.

Systems for generating or growing simulated neural circuits are described below. In such systems, simulated neural circuits may be generated by simulating the growth of the axonal and dendritic trees of arrays of simulated neurons and by simulating the formation and disintegration of connections (i.e., synapses) between neurons. In such systems, the growth of the dendritic trees of arrays of neurons, the growth of the axonal trees of arrays of neurons, and the wiring of neurons to each other may be achieved via strictly local interactions. These interactions may be both between elements, for example between an axonal segment of one neuron and a dendritic segment of the next, as well as between an element and local properties of the environment with which it is in contact, for example between the tip of a growing axon and a "chemical" gradient of a substance which attracts or repulses that axon as it grows. The interaction with chemical gradients controls the long-distance trajectory of axons and dendrites, and hence establishes the coarse fabric of the neural circuit. The interaction ongoing between active elements wires the circuit with specificity that embeds information and function. Furthermore, the formation, growth, and development of simulated neural circuits may be activity-dependent, influenced by activity in the elements of the simulated neural circuits as they grow.

Wiring a neural circuit can be seen as a choice of which neurons should be connected out of all the possible combinations and how heavily such connections should be weighted. Therefore, it is a common property of neural network models to predefine a pattern of connectivity, and then to strengthen or weaken the weights of extant connections to reduce this initial pattern to a final functional circuit. A weight of zero would correspond to an absent connection, while a relatively high weight would correspond to a strong connection from which an output generated in response to an input received at the connection would be weighted according to the weight assigned to the connection. However, to produce a pattern of connectivity through setting weights to zero requires that all potential connections between neurons be implemented in the initial predefined pattern. This is difficult, if not impossible, for biological-scale neural circuits because of the combinatorial explosion of potential connections.

For example, a set of 10,000 neurons, each with 1,000 synaptic connections spread across 100 dendritic branches, will have a total of $10^7$ connections. However, if the axons of a second set of 10,000 neurons makes all-to-all possible connections with the dendrites of the first set, there would be $10^{12}$ all-to-all potential connections between the two sets of neurons. In other words, to produce a wiring pattern for this example circuit using approaches based solely on strengthening or weakening existing weights would require $10^5$ greater usage of computational resources than are needed for the final circuit.

However, as disclosed below, it is possible to efficiently wire simulated neural circuits using techniques that do not rely on maintaining and modifying the huge space of all potential connections. The strengthening and/or weakening of the weights of existing connections may be compatible with the techniques for connection, formation, and dissolution disclosed below, but such strengthening and/or weakening is not a necessary component of the techniques for growing and wiring simulated neural circuits disclosed below. In some implementations, all connection weights may be uniform.

A set of local rules may be introduced to guide the appearance and disappearance of connections during the wiring process. For example, simulated dendritic branches may form and subsequently stabilize and maintain connections with simulated axons that fire in correlation with the dendritic branches. Connections of a dendritic branch made with simulated axons that have poorly correlated firing may be destabilized and lost. Stability may be a state variable of the connection between two neurons that can be increased or decreased as a function of the relationships of activity (e.g., temporal correlation) of the two neurons. If stability drops below some parameterized value, the connection may be removed. Additionally or alternatively, in order to ensure that all dendrites receive a desired density of connections, simulated axons may be influenced to grow in the direction of and/or connect to simulated dendrites that are impinged by relatively few simulated axons.

Three-dimensional voxel spaces are particularly well-suited for simulating the physical space in which biological neurons grow. They facilitate the efficient simulation of the local interaction between growing neural elements as well as the processing of local rules that guide the forming and disintegration of connections during the wiring process. Accordingly, in some implementations, simulated neural circuits may be grown within three-dimensional voxel spaces.

Figure 1B:
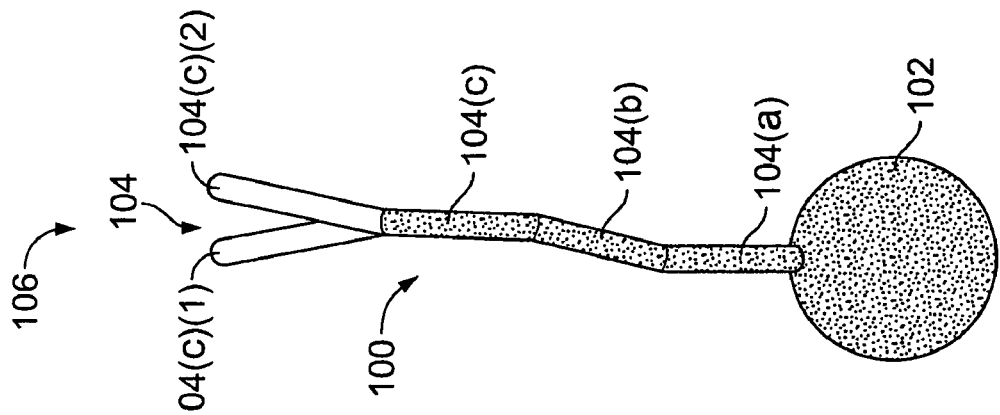
Figure 1A:
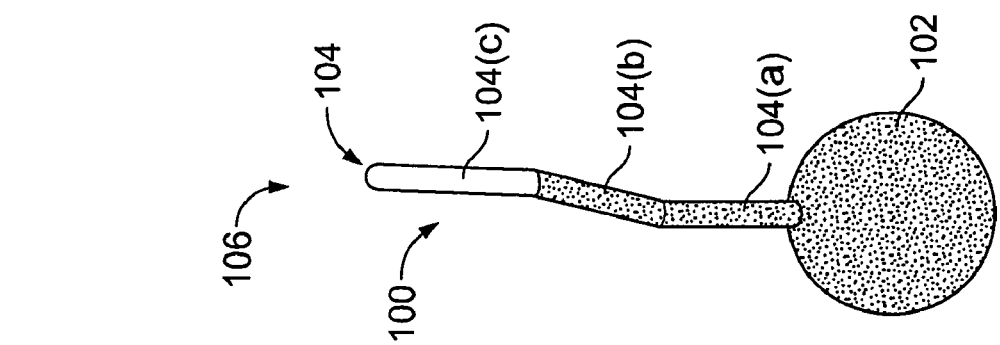

FIG. 1*a* is a block diagram of a simulated neuron 100 at a first stage of growth. The simulated neuron 100 may be generated and thereafter grown (as discussed in more detail below) by, for example, a system for growing simulated neural circuits such as that illustrated in FIG. 12 and discussed more fully below. The simulated neuron 100 of FIG. 1*a* includes a cell body 102, or soma, and a dendritic tree 104 having segments 104(*a*), 104(*b*), and 104(*c*). Input signals to the simulated neuron are received by the dendritic tree 104 and transmitted to the cell body 102. As illustrated in FIG. 1*a*, the dendritic tree 104 has only a single branch. However, as the simulated neuron 100 grows, the dendritic tree 104 may recursively divide, resulting in numerous dendritic branches and sub-branches within the dendritic tree 104.

Attractants and Repellents with Cell Type-Specific Interactions to Guide Coarse-Grained Circuit Growth The physical spaces in which biological neurons grow may include chemotropic substances (e.g., chemical attractants and/or repellants) that influence the direction or orientation of the growth of the neurons' dendrites. That is to say, as the dendritic branches of a biological neuron grow, these dendritic branches may be attracted toward one or more chemical attractants and/or repelled away from one or more chemical repellants present in the physical space. Such chemical attractants and/or repellants may exhibit static spatial patterns (e.g., gradients or stratifications) in the physical space and multiple chemical attractants and/or multiple chemical repellants may be present in the same physical space concurrently. Further, a given attractant/repellent may have a distinctly parameterized interaction with the axonal and dendritic branches of each distinct type of neuron.

Additionally or alternatively, the spatial patterns of the chemical attractants and/or repellants in the physical space may change over time. For example, the firing of an axon of a neuron may be accompanied by the release of a chemical attractant that may influence one or more dendritic branches to grow in the direction of the released chemical attractant. In this manner, dendritic branches may be influenced to grow toward neural activity.

As the dendritic trees of neurons grow, the new branches that sprout from the dendritic trees may be of various different types that grow differently and that interact differently with other neural elements. For example, different types of dendritic branches may exhibit different affinities for different chemotropic substances present in the physical space in which neurons grow such that different chemotropic substances may influence the growth of different types of dendritic branches differently. Furthermore, different types of dendritic branches may exhibit different affinities for different types of neural elements such that certain types of dendritic branches may have a greater tendency to grow towards and/or form connections with certain types of neural elements than others.

The simulated neuron 100 of FIG. 1a is grown in a simulated physical space 106 that, while not illustrated as such, may include one or more spatial patterns of simulated molecular attractants and/or one or more spatial patterns of simulated molecular repellants that may influence the direction or orientation of growth of the simulated neuron 100. Consequently, as the dendritic tree 104 of the simulated neuron 100 grows, its dendrites may be attracted toward the one or more simulated molecular attractants and/or repelled away from the one or more simulated molecular repellants.

Branch Tips as Automata

In one implementation, axonal and dendritic branches may be grown by a series of incremental actions taken by their "tip" elements. These branch tips are automata that may exist in one of a plurality of states, with each state being associated with a particular action. For example, in one implementation, 5 states exist: terminated, extending, bifurcating, retracting, and static with permitted actions as follows:

| Tip state | Permitted action |
| --- | --- |
| Terminated | None |
| Extending | Extend a single tip extension, which becomes the active tip |
| Bifurcating | Extend two tip extensions, both of which become active tips |
| Retracting | Eliminate the current tip, the parent becomes the active tip |
| Static | Do nothing but remain active |

FIG. 1b is a block diagram of the simulated neuron 100 of FIG. 1a after growing the active dendritic segment 104(c) according to the bifurcate growth state. As illustrated in FIG. 1b, the active dendritic segment 104(c) of FIG. 1a has been bifurcated into two new active dendritic segments 104(c)(1) and 104(c)(2) and dendritic segment 104(c) has been deactivated.

Methods of Extension of a Branch Tip

In some implementations, growing an active dendritic segment according to the bifurcate growth state involves randomly, or pseudo randomly, generating a collection of candidate extension segments and then selecting two or more segments from the collection of candidate segments as new segments to be added to the dendritic tree. For example, a set of candidate extension segments having different orientations (e.g., different azimuthal angles) and/or lengths may be generated randomly by the system. Constraints then may be imposed to limit the universe of potential candidate extension segments from which the actual candidate extension segments may be selected (e.g., a maximum azimuthal angle may be defined for the potential candidate extension segments) and the actual segments to be added then may be selected.

After the candidate extension segments have been selected, each candidate segment may be assigned a score representing a measure of the relative desirability of adding the segment to the dendritic tree. For instance, a candidate segment that is oriented in the direction of a simulated attractant may be rewarded whereas a candidate segment that is oriented in the direction of a simulated repellant may be penalized. Similarly, and as discussed more fully below, a candidate dendritic segment that enters an area of the physical space (e.g., a voxel) that is crowded with one or more other dendritic branches may be penalized, whereas a candidate dendritic segment that enters an area of the physical space that is not crowded by one or more other dendritic branches may be rewarded. Further, a candidate dendritic segment that enters an area of the physical space occupied by high density of axons may be rewarded, whereas a candidate dendritic segment that enters an area of the physical space not occupied by axons may be penalized.

To implement a bifurcating extension, for example, after each candidate segment has been assigned a score, two of the segments are selected to be added. In some implementations, the selected segments may simply be those with the highest scores. In alternative implementations, the candidate segments may be first ranked according to their assigned scores, and then the two segments to be added to the dendritic tree 104 may be selected randomly, or stochastically, with probabilities of being chosen being proportional to the scores of each candidate extension.

FIG. 1c is a block diagram of the simulated neuron 100 of FIG. 1a after growing the active dendritic segment 104(c) according to the extend growth state. As illustrated in FIG. 1c, the active dendritic segment 104(c) of FIG. 1a has been deactivated and a new active dendritic segment 104(d) has been added to the end of the dendritic tree 104.

Just as growing an active dendritic segment according to the "bifurcate" growth state, in some implementations, growing an active dendritic segment according to the "extend" growth state involves randomly, or pseudo randomly, generating a collection of candidate extension segments and then selecting one candidate segment from this collection of candidate segments as the new segment to be added using the techniques described above.

Figure 1F:
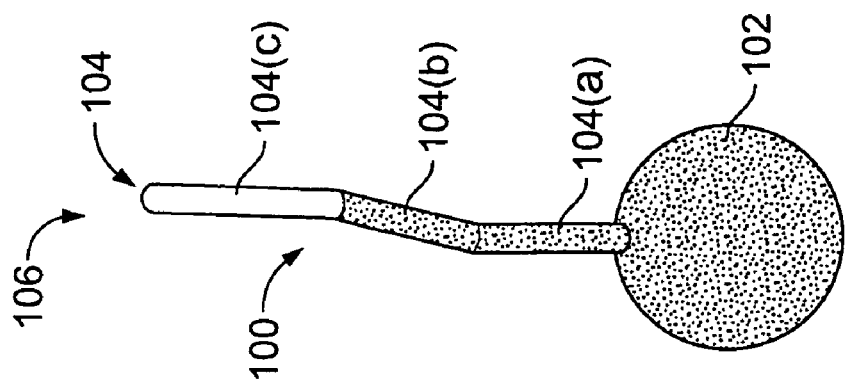
Figure 1E:
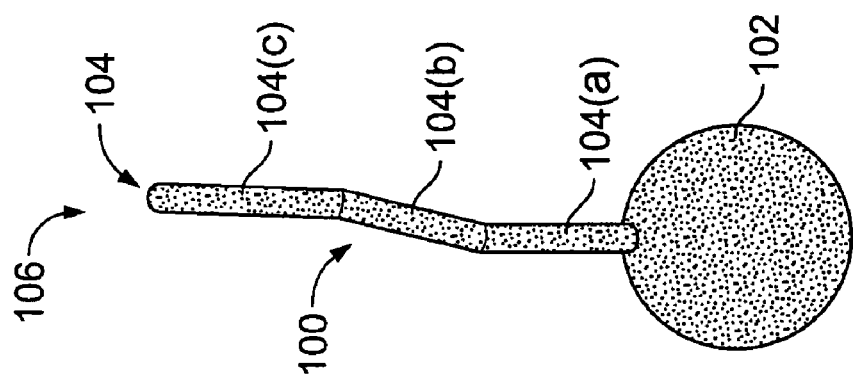
Figure 1D:
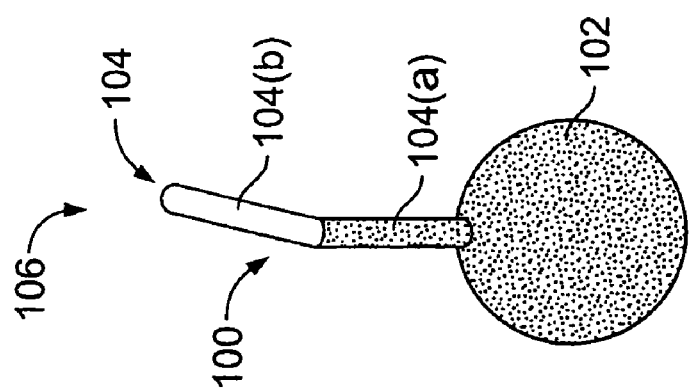

FIG. 1d is a block diagram of the simulated neuron 100 of FIG. 1a after growing the active dendritic segment 104(c) of FIG. 1a according to the retract growth state. As illustrated in FIG. 1d, the active dendritic segment 104(c) of FIG. 1a has been deleted from the dendritic tree 104 and the dendritic segment 104(b) immediately preceding the active dendritic segment 104(c) of FIG. 1a has been activated. Growing an active segment according to the "retract" growth state may be an important capability in implementations in which multiple simulated neurons are grown simultaneously, because it may enable a branch of a simulated neuron to withdraw from a region containing a poor selection of branches with which to potentially form connections, and subsequently extend into another region containing a richer selection of branches with which to potentially form connections.

FIG. 1e is a block diagram of the simulated neuron 100 of FIG. 1a after growing the active dendritic segment 104(c) of FIG. 1a according to the terminate growth state. As illustrated in FIG. 1e, the active dendritic segment 104(c) of FIG. 1a has been deactivated, thereby effectively terminating the growth of the dendritic tree 104.

FIG. 1f is a block diagram of the simulated neuron of FIG. 1a after growing the active dendritic segment 104(c) of FIG. 1a according to the rest (or static) growth state. As illustrated in FIG. 1f, after growing the active dendritic segment 104(c) according to the rest growth state, the simulated neuron remains unchanged. That is to say, the active dendritic segment 104(c) of FIG. 1a remains active and no additional bifurcation, extension, or retraction has occurred.

Figure 1G:
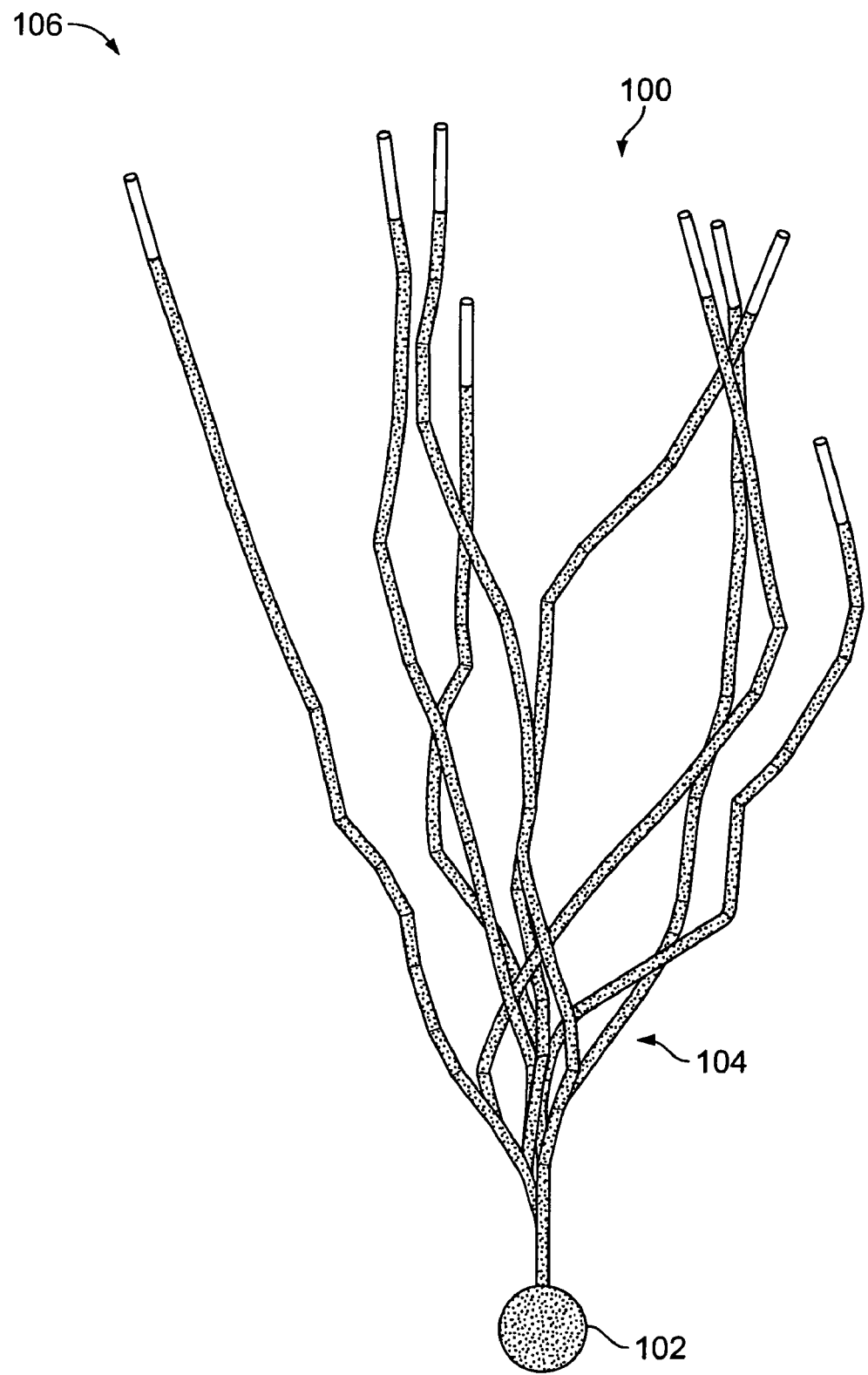

FIG. 1g is a block diagram of the simulated neuron 100 of FIG. 1a after the simulated neuron 100 has progressed through a series of growth stages. As illustrated in FIG. 1g, the original dendritic tree 104 illustrated in FIG. 1a has extended and bifurcated many times over resulting in a more elaborate tree structure. In addition, the direction of the growth of the dendritic tree 104 has been in a generally upward direction. The generally upward direction of the growth of the dendritic tree 104 is here due to the presence of a gradient (not illustrated) of a simulated attractant in the upward direction of the simulated physical space 106.

The above discussion and FIGS. 1a-1g describe the growth of the dendritic tree 104 of the simulated neuron 100 as emanating from one or more active segments located on the ends of the branches of the dendritic tree 104. However, in some implementations, active segments may be located anywhere along the dendritic branches. Consequently, in these implementations, new dendritic branches may sprout from any active segment along a dendritic branch, not just from the end of a dendritic branch. Furthermore, while the above discussion and FIGS. 1a-1g describe techniques for growing a dendritic tree of a simulated neuron, similar techniques may be applied to grow an axonal tree of a simulated neuron.

Voxel Space: A Substrate for the Growth of Neural Circuitry

In some implementations, the simulated physical space in which simulated neural circuits are grown may be modeled using a three-dimensional array of elements, or voxels, known as a voxel space. In such implementations, the individual voxels of the voxel space represent individual portions of the simulated physical space. Voxels store a number of different local variables that collectively describe the properties of the portions of the simulated physical space that the voxels represent. For example, voxels may be configured to store information about the dendrite segment density (i.e., the number and type of dendritic segments present) and/or the axonal segment density (i.e., the number and type of axonal segments present) in the portions of the simulated physical space represented by the voxels. In addition, voxels may be configured to store information about the presence and/or concentrations of simulated attractants and/or simulated repellants in the portions of the simulated physical space represented by the voxels.

Figure 1H:
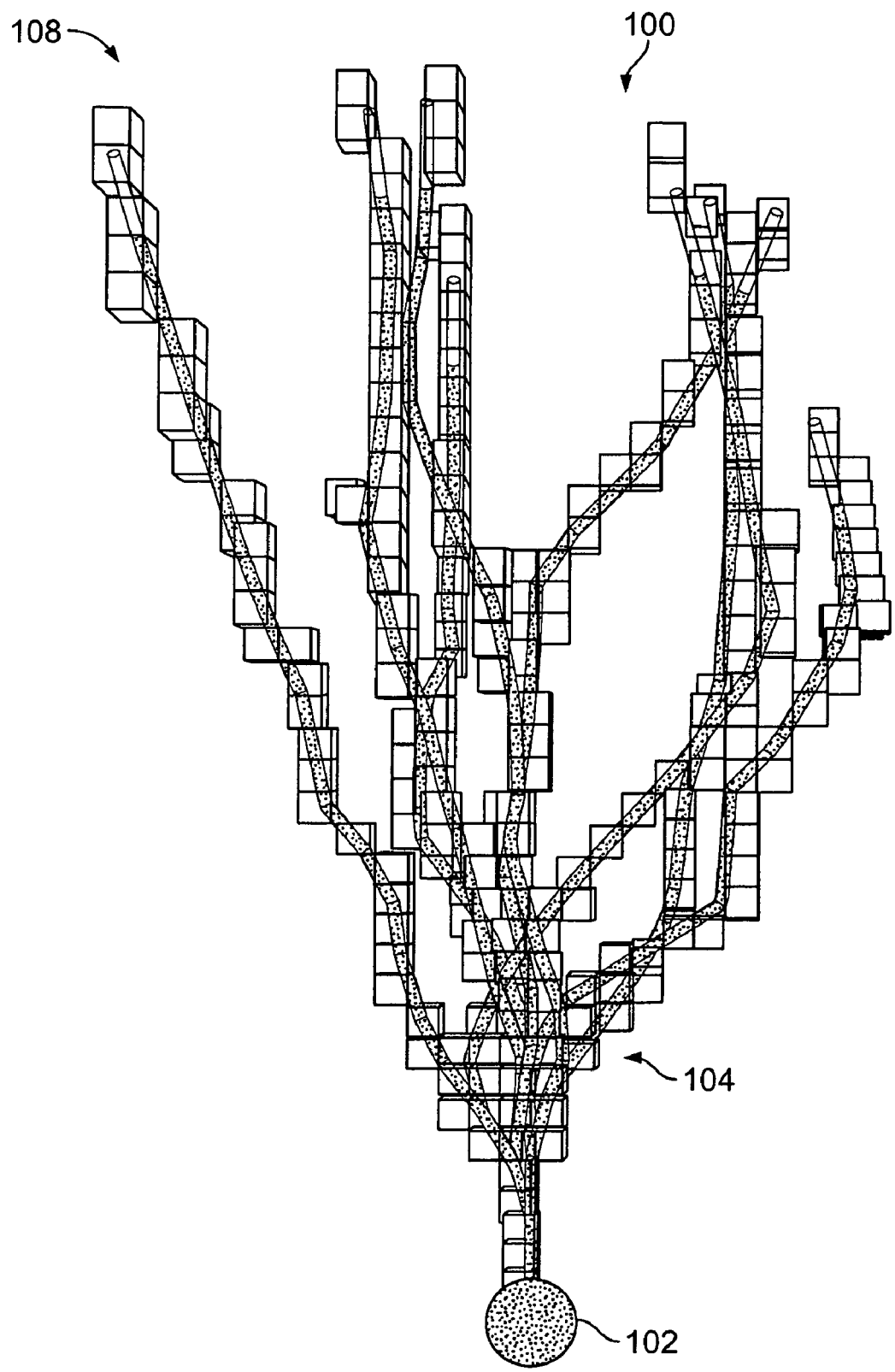

FIG. 1h is a block diagram of the simulated neuron 100 of FIG. 1g that visually illustrates implementing the simulated neuron 100 in a voxel space 108. As illustrated in FIG. 1h, the individual voxels of the voxel space 108 are depicted as three-dimensional cubes. So as not to obscure other elements, only those individual voxels that are occupied by dendritic branch segments are illustrated in FIG. 1h. Nevertheless, it will be understood that the voxel space 108 is a three-dimensional array of voxels that includes a number of additional voxels that are not visually depicted in FIG. 1h.

A voxel space may be a particularly appropriate data structure for implementing simulated neurons because voxel spaces are good analogues to the physical spaces in which biological neurons grow. For example, due to their ability to store localized information, voxels may be particularly appropriate for simulating the presence of repellants and/or attractants locally released during growth by different simulated neural elements. Furthermore, the ability of voxels to store localized information also may limit the processing and/or computational load involved in processing local rules introduced to guide the formation and disintegration of connections between various different simulated neural elements.

Moreover, using a voxel space to implement simulated neurons may limit the processing and/or computational load involved in extending and/or bifurcating dendritic branches and axons. As described above, dendritic branches and axons may be extended and/or bifurcated by selecting a collection of candidate extension segments, calculating and assigning desirability scores to the selected candidate extension segments, and selecting one or more candidate extension segments based on the assigned desirability scores.

Growing simulated neural circuits in a voxel space may enable an elegant and efficient process for calculating and assigning desirability scores for candidate extension segments. As discussed above, depending on the type of neural element from which they extend, candidate extension segments may have different affinities for different types of neural elements and/or different types of simulated attractants and repellants. For example, candidate segments may have negative affinities for certain chemical repellants and positive affinities for certain chemical attractants. Similarly, candidate segments for a dendritic branch may have a negative affinity for other dendrites and a positive affinity for axons, while candidate segments for axons may have a negative affinity for other axons and a positive affinity for dendritic branches.

Because voxels enable the storage of localized information such as, for example, chemical attractant concentrations, chemical repellant concentrations, and neural element densities, a desirability score for a candidate extension segment may be calculated simply by considering the localized information stored in the voxel(s) into which the candidate extensions extend. For example, the desirability score, V, of a candidate extension segment may be defined algebraically by:

$$V = \sum_i a_i \cdot [c_i] + \sum_j a_j^S [d_j] \qquad [1]$$

where $a_i$ represents the affinity of the candidate extension segment for a particular chemical present in the voxel(s) into which the candidate segment extends, $c_i$, represents the concentration of a particular chemical present in the voxel(s) into which the candidate segment extends, $a_j$ represents the affinity of the candidate extension segment for a particular type of neural element present in the voxel(s) into which the candidate segment extends, and $d_j$ represents the density of a particular type of neural element present in the voxel(s) into which the candidate segment extends. Equation 1 is merely one example of an equation for calculating desirability scores for candidate segment extensions. Accordingly, desirability scores can be calculated according to different equations that include different and/or additional factors that influence growth.

Figure 2A:
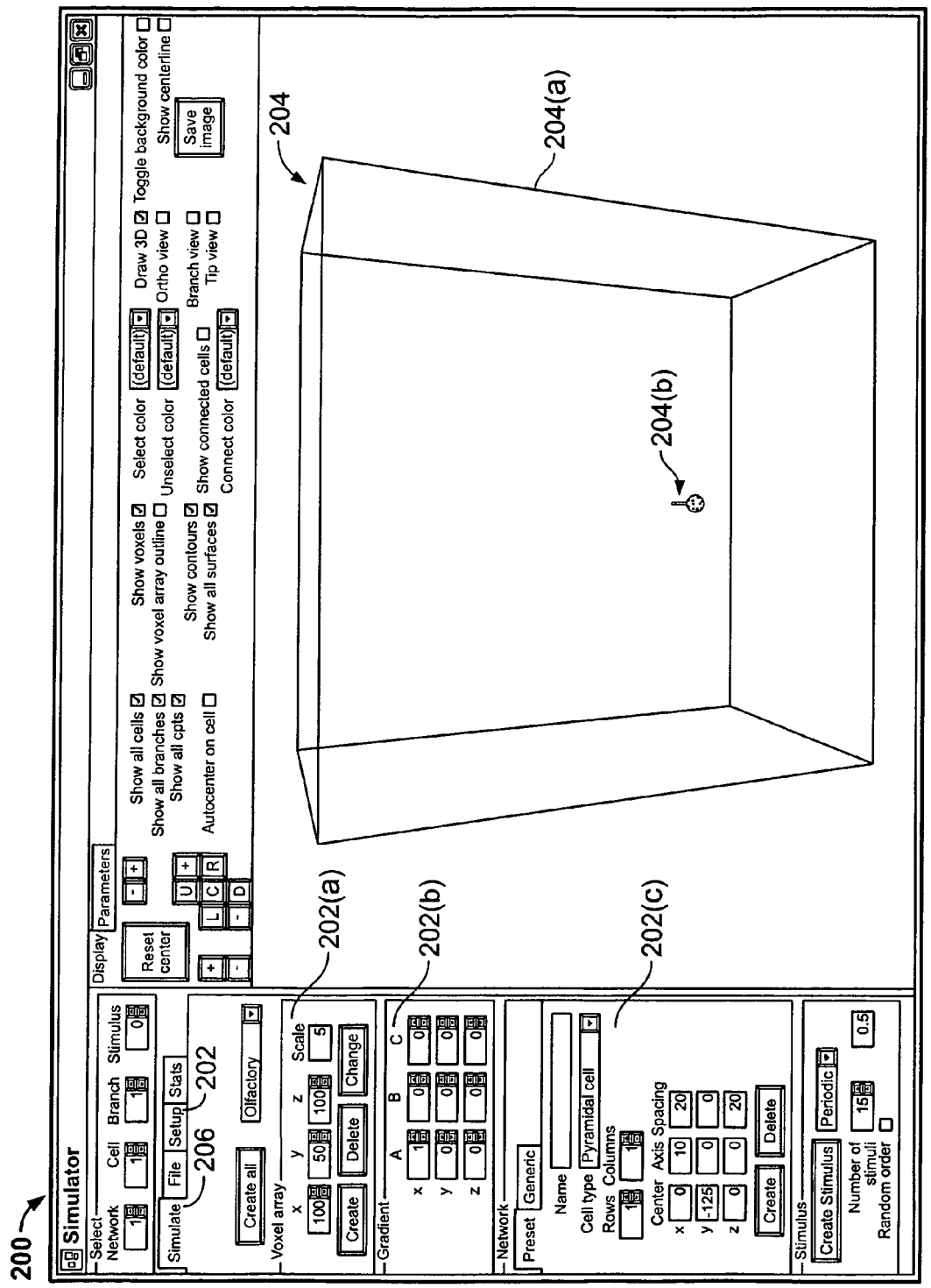
FIGS. 2a-2c are screenshots of a graphical user interface for generating simulated neurons.

FIG. 2a is a screenshot of a graphical user interface (GUI) 200 for growing simulated neural circuits using, for example, a system for growing simulated neural circuits such as the system of growing simulated neural circuits illustrated in FIG. 12 and discussed more fully below. The GUI 200 may be rendered on, for example, a display or monitor. Among other features, the GUI 200 includes a setup control tab 202, a simulation pane 204, and a simulate control tab 206.

More particularly, the setup control tab 202 includes, among other features, a voxel array setup control 202(a), a gradient setup control 202(b), and a simulated neural circuit setup control 202(c). The voxel array setup control 202(a) enables a user to specify the dimensions of a voxel space in which to grow a simulated neuron or a simulated neural circuit as well as the size (i.e., scale) of each voxel in the voxel space. As illustrated in FIG. 2a, the voxel array setup control 202(a) specifies a voxel space of one hundred voxels by fifty voxels by one hundred voxels, where each individual voxel is a five by five unit cube.

The gradient setup control 202(b) enables a user to specify one or more gradients of chemotropic substances (e.g., attractants or repellants) to be generated within the voxel space. As illustrated in FIG. 2a, the gradient setup control 202(b) enables a user to specify the magnitudes and orientations of up to three different three-dimensional gradients of simulated attractants and/or repellants (e.g., gradient A, gradient B, and/or gradient C). While the gradient setup control 202(b) illustrated in FIG. 2a only enables a user to specify three gradients of simulated attractants and/or repellants, additional gradients of attractants and/or repellants may be generated. Furthermore, the spatial patterns of simulated attractants and/or repellants generated in the voxel space may not be limited to gradients. Rather, other spatial patterns of attractants and/or repellants, such as, for example, stratifications, also may be generated in the voxel space.

The simulated neural circuit setup control 202(c) enables a user to specify the number and type of simulated neurons to be generated and grown as well as the initial position of the cell bodies of the simulated neurons to be generated and grown. As illustrated in FIG. 2a, the simulated neural circuit setup control 202(c) specifies that one pyramidal cell-type simulated neuron is to be generated and grown.

The simulation pane 204 presents a visual representation of the simulated neuron or simulated neural circuit generated and grown using the GUI 200. As illustrated in FIG. 2a, the simulation pane 204 includes an outline of a voxel space 204(a) and a visual representation of a simulated neuron 204(b). The dimensions of the voxel space 204(a) correspond to the dimensions specified for the voxel space in the voxel array setup control 202(a). Similarly, one pyramidal cell-type simulated neuron 204(b) is shown in the voxel space 204(a) because the simulated neural circuit setup control 202(c) specifies that one pyramidal cell-type simulated neuron is to be generated in the voxel space 204(a).

Figure 2B:
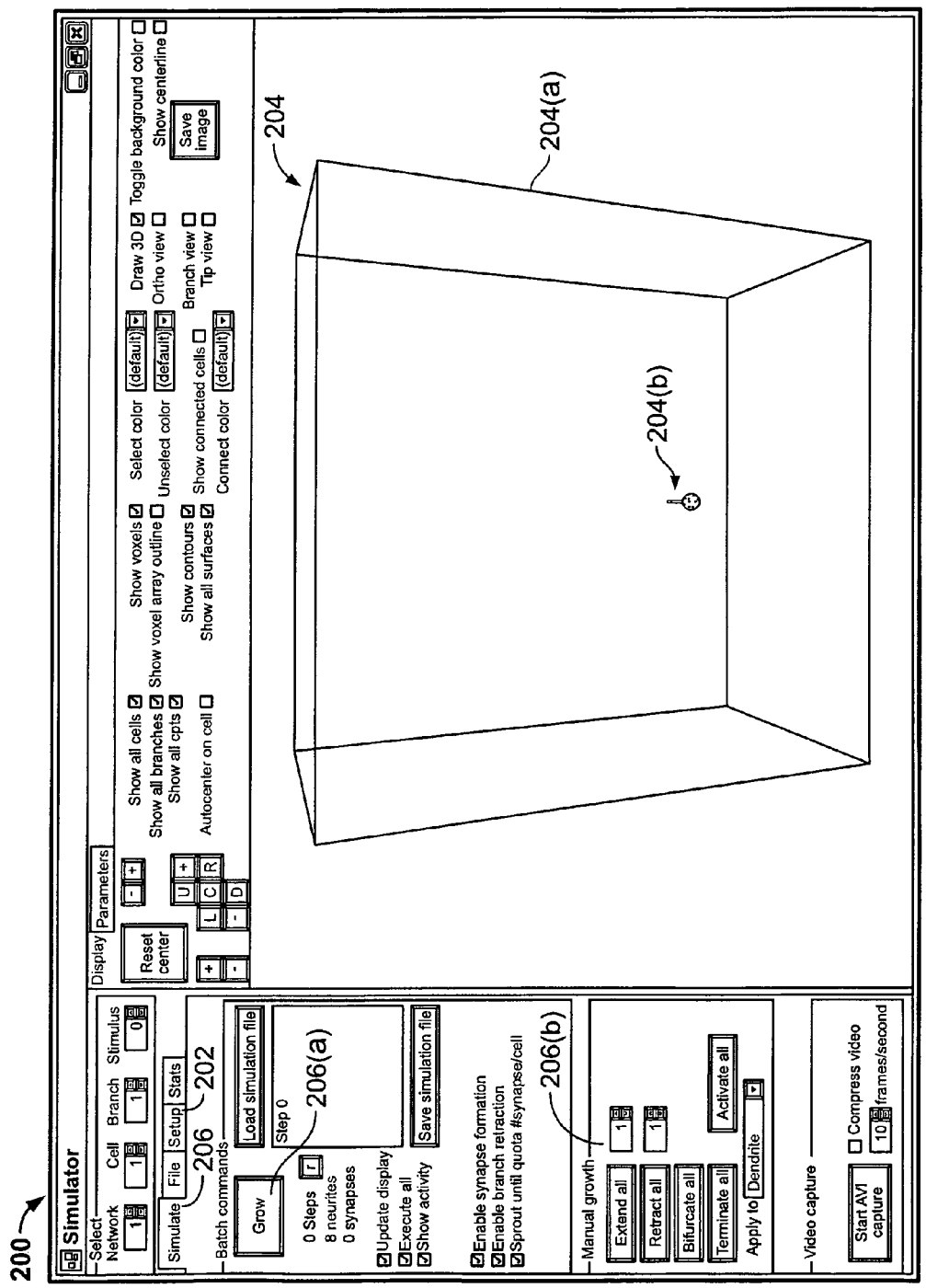

The GUI 200 also includes a simulate tab 206 that enables a user to grow the simulated neuron or neural circuit generated using the setup tab 202. FIG. 2b is a screenshot of the GUI 200 with the simulate tab 206 selected. As illustrated in FIG. 2b, the simulate tab 206 includes, among other features, a grow button 206(a) and a manual growth control 206(b). Selection of the grow button 206(a) causes the system to grow the simulated neuron or neural circuit generated using the setup tab 202. For example, selecting the grow button 206(a) may cause the system to select a growth state (e.g., bifurcate, extend, retract, terminate, or rest) for each active segment of the simulated neuron or neural circuit and grow the simulated neuron or neural circuit according to the selected growth states. In some implementations, selection of the grow button 206(a) may trigger the system to repeatedly progress through growth stages until the grow button 206(a) is selected again, signaling that growth of the simulated neuron or neural circuit should be halted. In other implementations, selection of the grow button 206(a) may trigger only a single growth stage. In such implementations, repeated growth of the simulated neurons 206(a) may be inspired through the repeated selection of the grow button 206(a).

The manual growth control 206(b) enables a user to manually control the growth of the simulated neuron or neural circuit. As illustrated in FIG. 2b, the manual growth control 206(b) enables a user to extend all of the active segments of the simulated neuron or neural circuit by a specified number of segments, to retract all of the active segments of the simulated neuron or neural circuit by a specified number of segments, to bifurcate all of the active segments of the simulated neuron or neural circuit, to terminate all of the active segments of the simulated neuron or neural circuit, or to activate all of the previously terminated segments of the simulated neuron or neural circuit.

Figure 2C:
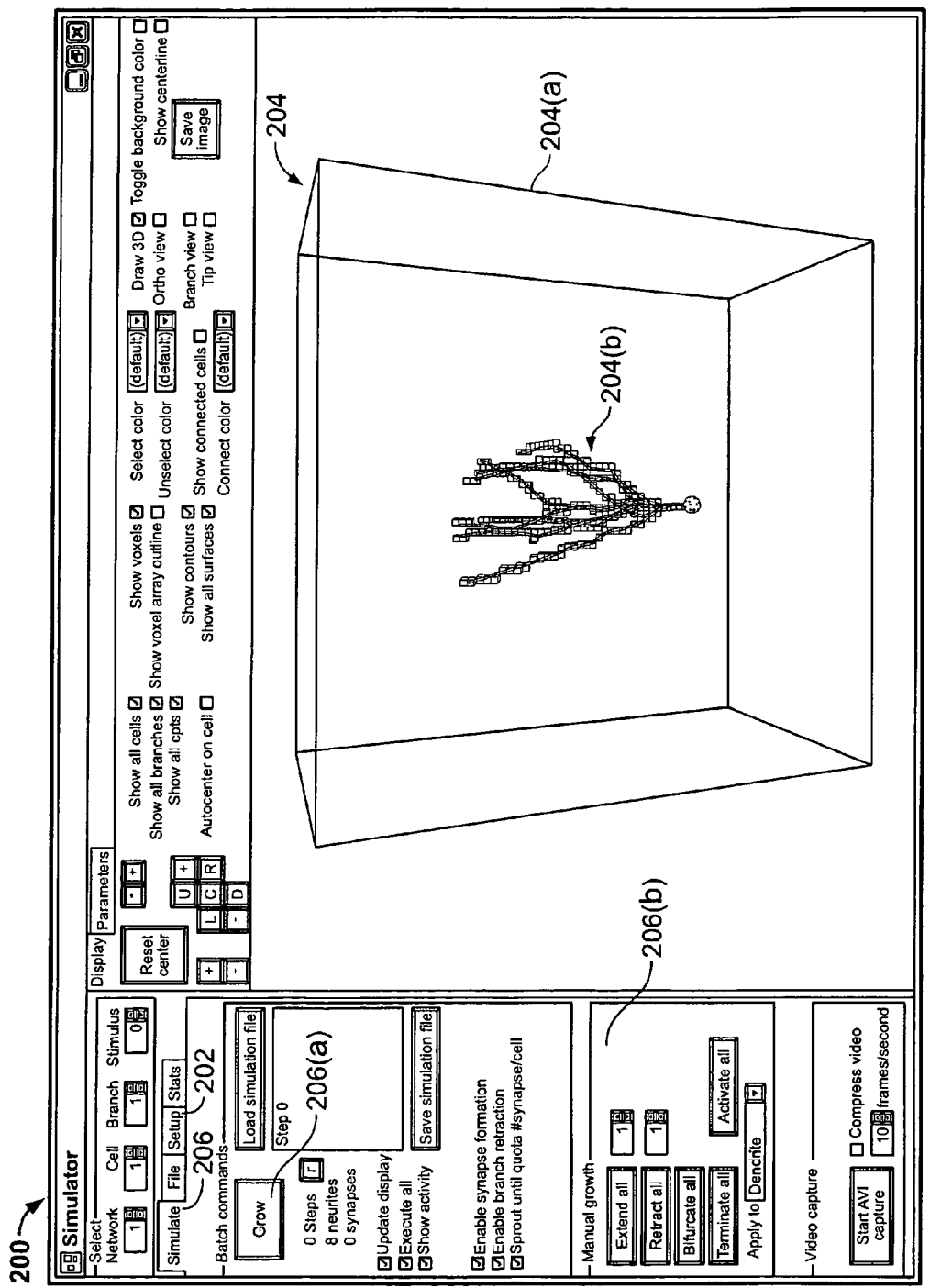

FIG. 2c is a screenshot of the GUI 200 after the simulate tab 206 has been used to grow the simulated neuron 204(b). As illustrated in FIG. 2c, the dendritic tree of the simulated neuron 204(b) has branched and extended many times as a result of the growth process.

Figure 3:
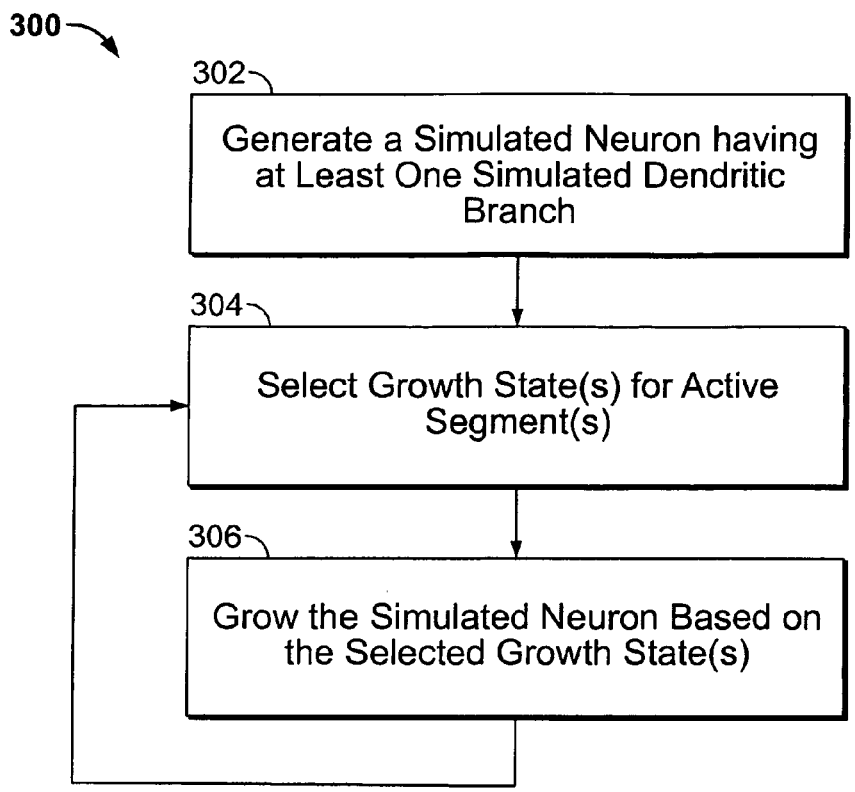
FIG. 3 is a flowchart of a process for generating a simulated neuron.

FIG. 3 is a flowchart of a process 300 for growing a simulated neuron. The process 300 begins by generating a simulated neuron that has at least one simulated dendritic branch (302). To grow the simulated neuron, a growth state is selected for an active segment of the dendritic branch (304). For example, a particular growth state for the active segment may be selected from among an extend growth state, a bifurcate growth state, a retract growth state, a rest growth state, and a terminate growth state. In various implementations, the growth state may be selected manually, randomly, pseudo-randomly, and/or algorithmically.

After selecting the growth state for the active segment, the simulated neuron is grown based on the selected growth state of the active segment (306). For example, growing the simulated neuron based on the "extend" growth state may involve extending the simulated dendritic branch. Growing the simulated neuron based on the "bifurcate" growth state may involve bifurcating the simulated dendritic branch into at least two new active segments, while growing the simulated neuron based on the "retract" growth state may involve retracting the simulated dendritic branch, growing the simulated neuron according to the "rest" growth state may involve maintaining the simulated dendritic branch in an unchanged state, and growing the simulated neuron according to the terminate growth state may involve deactivating the active segment.

After growing the simulated neuron according to the selected growth state of the active segment, growth states may be selected for the active segments (304) that resulted from growing the simulated neuron according to the previously selected growth state and the simulated neuron may be grown again based on the newly selected growth states (306). In some implementations, the process of selecting growth states for active segments (304) and growing the simulated neuron according to the selected growth states (306) may be repeated until the terminate growth state has been selected for each active segment and each active segment has been deactivated.

While FIG. 3 illustrates a process 300 for growing dendrites of a simulated neuron, a similar process may be used to grow the axons of a simulated neuron.

Biological neurons rarely grow in isolation. Rather, biological neurons generally grow in groups. Consequently, as the biological neurons grow, they may interact with each other and compete with each other for space. The techniques for growing individual simulated neurons described above may be particularly powerful for growing multiple simulated neurons simultaneously because they easily may be extended to account for considerations like crowding that are relevant to growing multiple simulated neurons simultaneously.

Figure 4A:
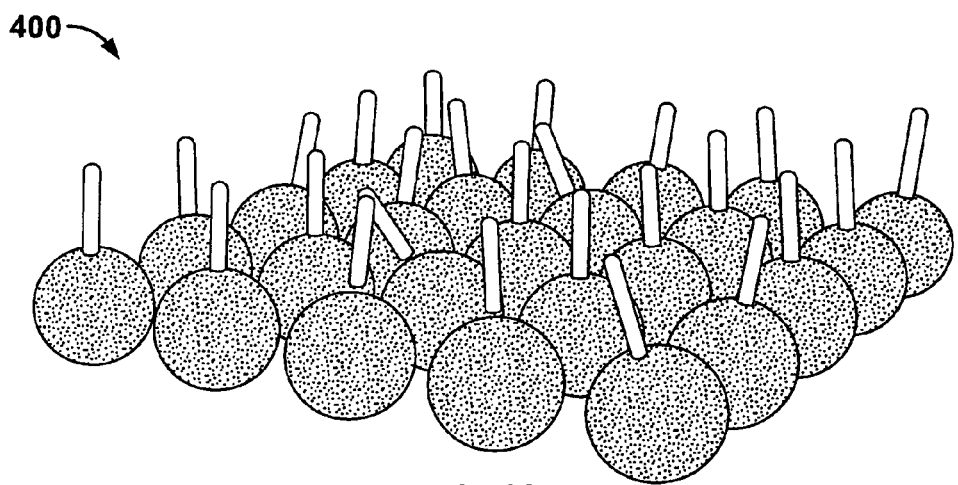

FIG. 4a is a block diagram of an array 400 of simulated neurons that may be generated and grown by, for example, a system for growing simulated neural circuits such as the system for growing simulated neural circuits illustrated in FIG. 12 and discussed more fully below. As illustrated in FIG.

4a, the array 400 of simulated neurons is a five by five array 400 of simulated neurons and the simulated neurons are at a first stage of growth.

The simulated neurons of the array 400 of simulated neurons all may be of the same cell type or they may be of different cell types that grow differently and that interact differently with different types of other neural elements. For example, one type of simulated neuron may have dendritic branches that are strongly attracted to a particular simulated attractant, while a different type of simulated neuron may have dendritic branches that are only weakly attracted (or not attracted at all) to the same simulated attractant. Additionally or alternatively, one type of simulated neuron may have dendritic branches that are attracted to a particular simulated attractant, whereas a different type of simulated neuron may have dendritic branches that are repelled by the same simulated attractant. Therefore, the cell types of the different simulated neurons and the distribution of the different simulated attractants and/or repellants may influence the growth of the simulated neurons.

Each of the simulated neurons of the array 400 of simulated neurons may be grown according to the techniques discussed above, for example, in connection with FIGS. 1a-1h, 2a-2c, and 3. Furthermore, the growth of each of the simulated neurons may be influenced by factors that are the same as or similar to the factors discussed above, for example, in connection with FIGS. 1a-1h, 2a-2c, and 3. One factor that may be particularly important as multiple simulated neurons grow simultaneously and compete with each other for space may be dendritic branch density.

FIG. 4b is a block diagram of the array 400 of simulated neurons that illustrates the array 400 of simulated neurons at a second stage of growth. As illustrated in FIG. 4b, the dendritic trees of the simulated neurons have branched and extended many times as a result of the growth process.

Figure 5A:
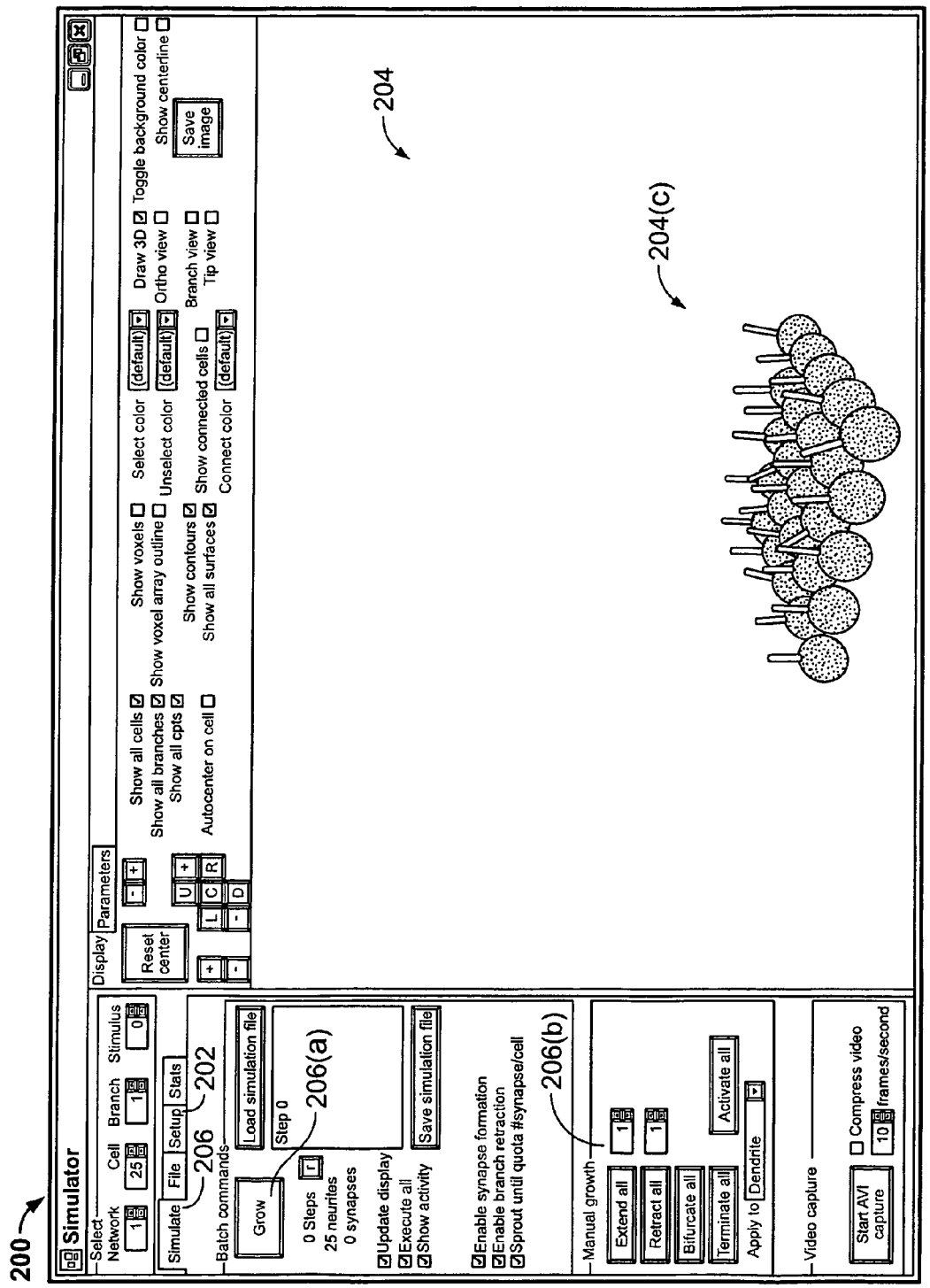
FIGS. 5a and 5b are screenshots of a graphical user interface of a system for generating simulated neural arrays.

FIG. 5a is a screenshot of the GUI 200 of FIGS. 2a-2c that illustrates the use of the GUI 200 to generate and grow an array 204(*c*) of simulated neurons. As illustrated in FIG. 5a, an array 204(*c*) of simulated neurons at a first growth state has been generated and is presented in the simulation pane 204. As discussed above in connection with FIGS. 2a-2c, the simulate tab 206 of the GUI 200 is configured to enable a user to grow the simulated neurons of the array 204(*c*) of simulated neurons. For example, a user can grow the simulated neurons of the array 204(*c*) of simulated neurons using the grow button 206(*a*) or the manual growth control 206(*b*).

Figure 5B:
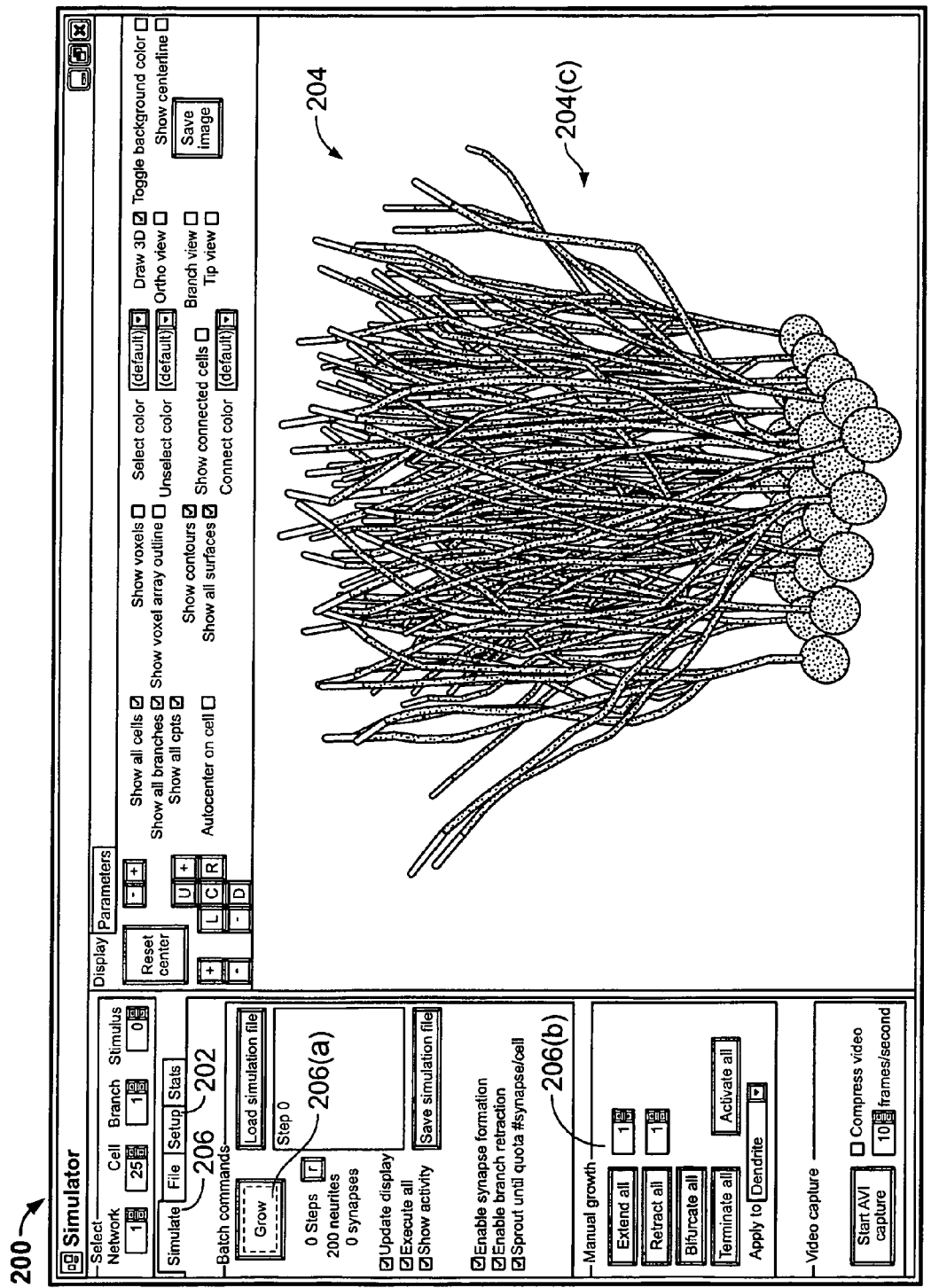

FIG. 5b is a screenshot of the GUI 200 after the simulate tab 206 has been used to grow the array 204(*c*) of simulated neurons. As illustrated in FIG. 5b, the dendritic trees of the simulated neurons have branched and extended many times as a result of the growth process, thereby creating a relatively complex mesh of intertwined dendritic branches.

Figure 6:
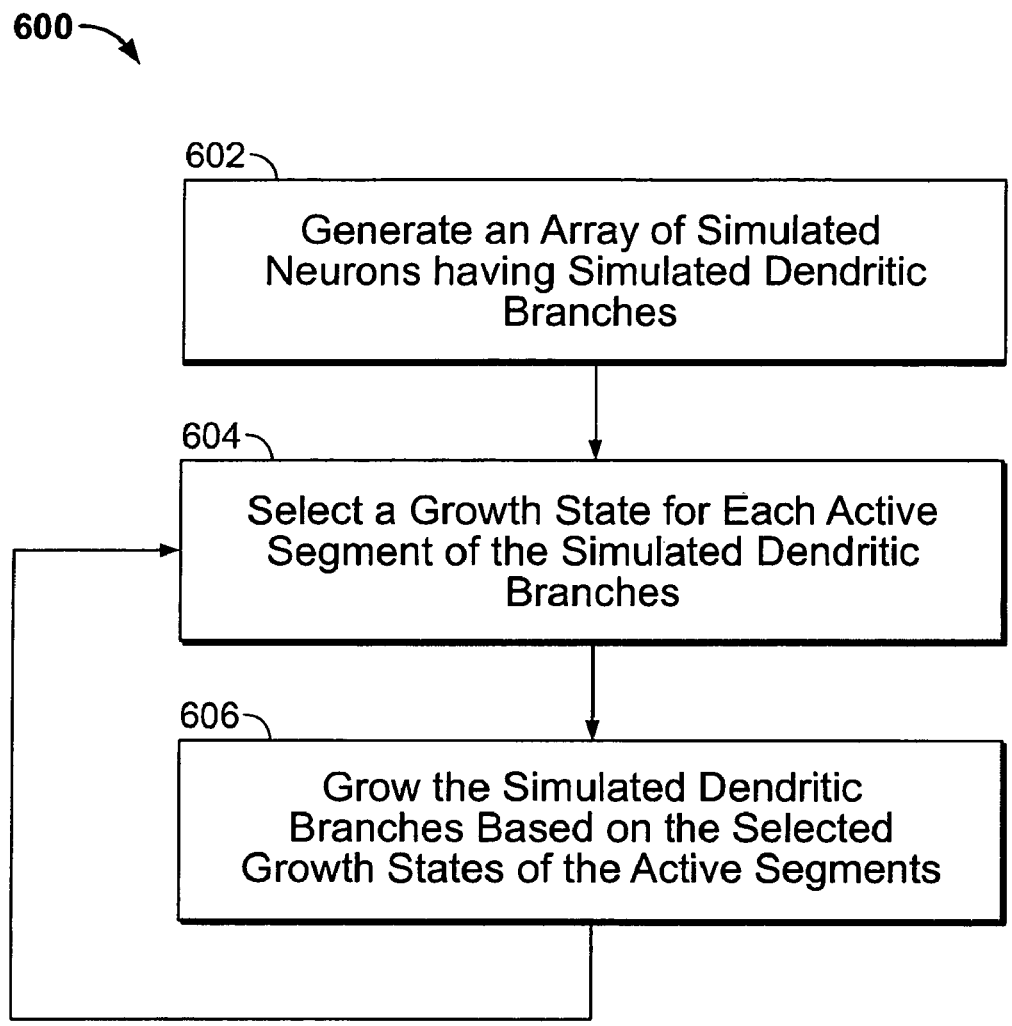
FIG. 6 is a flowchart of a process for generating a simulated neural array.

FIG. 6 is a flowchart of a process 600 for growing a simulated neuronal array. The process 600 begins by generating an array of simulated neurons having simulated dendritic branches (602). To grow the simulated neurons, a growth state is selected for each active segment of the various simulated dendritic branches (604) and each simulated dendritic branch is grown based on the growth state selected for its active segment (606).

After growing the simulated dendritic branches according to the selected growth states of the active segments, a new growth state may be selected for each active segment of the various simulated dendritic branches (604) and the simulated dendritic branches may be grown again based on the newly selected growth states (606). In some implementations, the process of selecting a growth state for each active segment (604) and growing the simulated dendritic branches according to the selected growth states (606) may be repeated until the terminate growth state has been selected for each active segment and each active segment has been deactivated.

While FIG. 6 illustrates a process for growing the dendritic branches of an array of simulated neurons, a similar process may be used to grow the axons of an array of simulated neurons.

A biological neural circuit generally includes numerous interconnected neurons. In particular, the neurons are connected by forming connections between output axons and input dendritic branches. These connections enable signals to be communicated through the neural circuit from neuron to neuron. Like biological neural circuits, simulated neural circuits may be grown by simultaneously growing and connecting multiple simulated neurons. The techniques for growing simulated neurons described above may be particularly powerful for growing simulated neural circuits because they easily may be extended to accommodate the simultaneous growing and connecting of multiple simulated neurons.

Figure 7A:
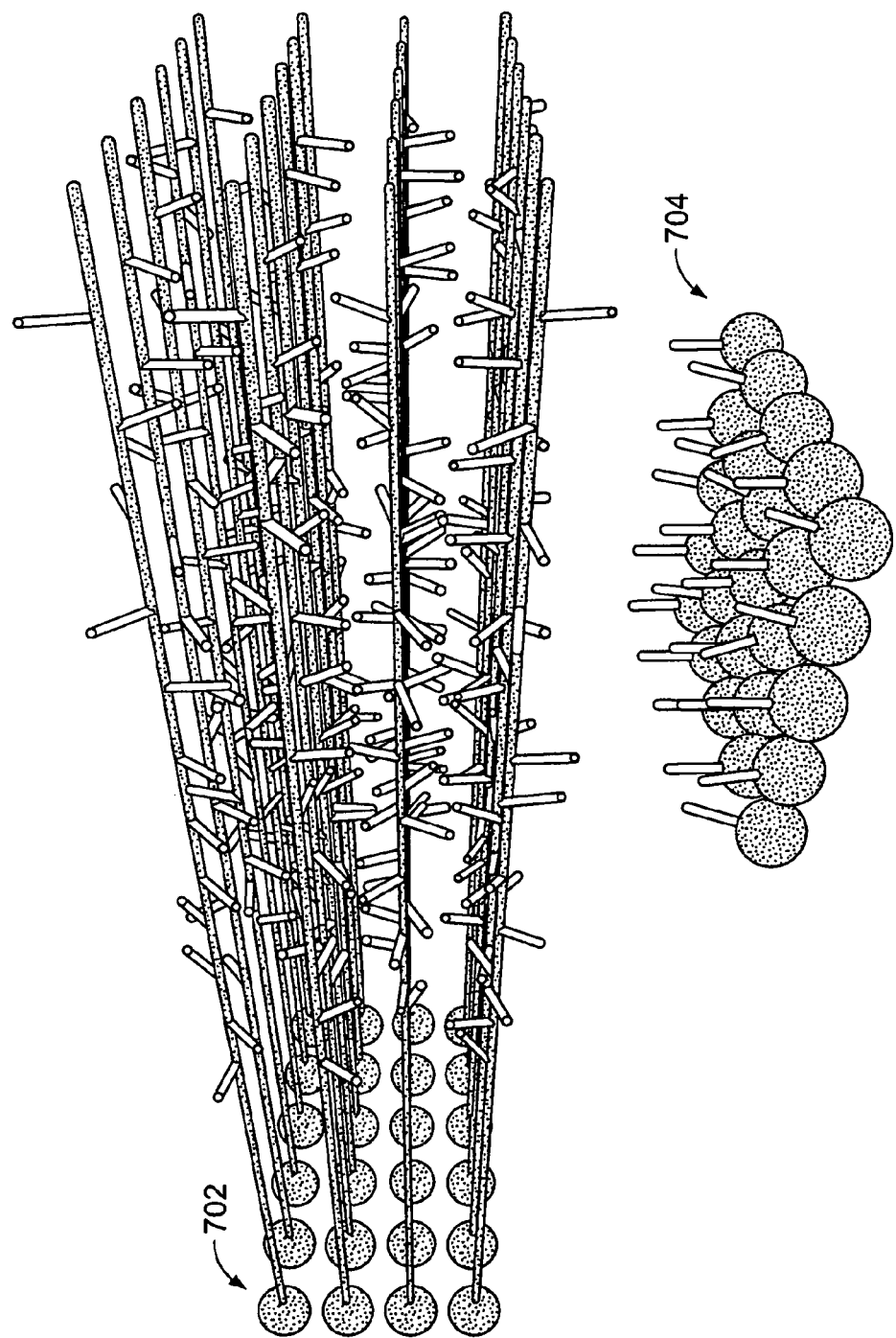
FIG. 7a is a block diagram of an output array of simulated neurons connected to an input array of simulated neurons.

FIG. 7a is a block diagram of a four by six output array 702 of simulated neurons and a five by five input array 704 of simulated neurons that may be generated and grown by, for example, a system for growing simulated neural circuits such as the system for growing simulated neural circuits illustrated in FIG. 12 and discussed more fully below. As illustrated in FIG. 7a, the output axons of the output array 702 of simulated neurons are not connected to the input dendritic branches of the input array 704 of simulated neurons.

However, connections between the output axons of the output array 702 of simulated neurons and the input dendrites of the input array 704 of simulated neurons may be created by growing both the output axons of the output array 702 of simulated neurons and the input dendritic branches of the input array 704 of simulated neurons according to the processes described above, for example, in connection with FIGS. 1a-1h, 2a-2c, 3, 4a, 4b, 5a, 5b, and 6. As the output axons of the output array 702 of simulated neurons and input dendrites of the input array 704 of simulated neurons grow, connections between the output axons and the input dendrites may be formed.

Various conditions may influence the forming of connections between axons and dendrites. In some implementations, connections may be formed between axons and dendrites that grow to within a certain proximity of one another. For example, in implementations in which voxel spaces are used to simulate the physical space in which neurons grow, connections may be formed between axons and dendrites that grow into the same voxels. Alternatively, connections may be formed between axons and dendrites that grow to within a certain number of voxels of one another. For instance, connections may be formed between axons and dendrites that grow to within three voxels of one another.

The forming of connections between axons and dendrites also may be influenced by the cell types of the simulated neurons from which the axons extend and the cell types of the simulated neurons from which the dendrites extend. For example, the axons that extend from different cell types may have different affinities for dendrites that extend from different cell types and vice versa. Similarly, the forming of connections between axons and dendrites also may be influenced by axonal branch type and dendritic branch type. For example, different axonal branch types may have different affinities for different dendritic branch types and vice versa.

Figure 7B:
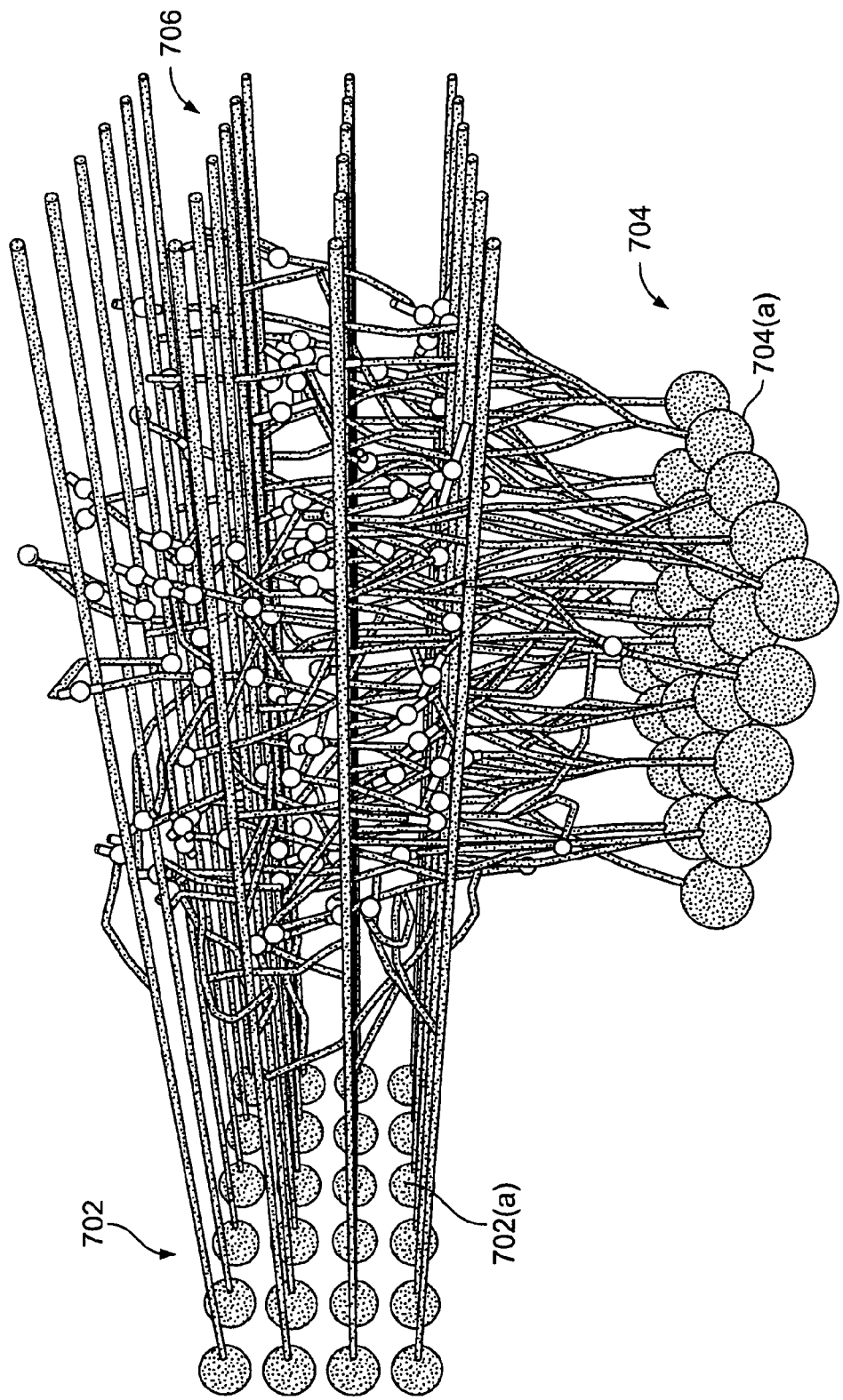

FIG. 7b is a block diagram of a simulated neural circuit 706 formed by growing and connecting the output axons of the output array 702 of simulated neurons and the input dendrites of the input array 704 of simulated neurons of FIG. 7a. As illustrated in FIG. 7b, the connections between the output axons of the output array 702 of simulated neurons and the input dendrites of the input array 704 of simulated neurons enable signals to propagate from the output array 702 of simulated neurons through the neural circuit 706 to the input array 704 of simulated neurons.

Even though the output array 702 of simulated neurons includes only twenty four simulated output neurons and the input array 704 of simulated neurons includes only twenty five simulated input neurons, the simulated neural circuit 706 formed by growing and connecting the output axons of the output array 702 of simulated neurons and the input dendrites of the input array 704 of simulated neurons is relatively complex. Naturally, increasingly complex simulated neural circuits may be grown by increasing the number of simulated neurons in the output array 702 of simulated neurons and/or increasing the number of simulated neurons in the input array 704 of simulated neurons. For example, simulated neural circuits may be generated and grown in which the output array of simulated neurons includes thousands, hundreds of thousands, or even millions of simulated output neurons and/or in which the input array of simulated neurons includes thousands, hundreds of thousands, or even millions of simulated input neurons. Additionally or alternatively, simulated neural circuits may be generated in which there are more than two arrays of simulated neurons. For example, simulated neural circuits may be generated in which there are hundreds, thousands, or even millions of interconnected arrays of simulated neurons and such simulated neural circuits may include feedback, as well as feed-forward, connections between arrays.

As a result of the complexity of the simulated neural circuit 706 formed by growing and connecting the output axons of the output array 702 of simulated neurons and the input dendrites of the input array 704 of simulated neurons, many of the connections between output axons and input dendrites are obscured in FIG. 7b. For example, it is difficult to discern to which simulated neurons of the input array 704 individual neuron 702(a) of the output array 702 is connected. Similarly, it is difficult to discern to which simulated neurons of the output array 702 individual neuron 704(a) of the input array 704 is connected.

Figure 7C:
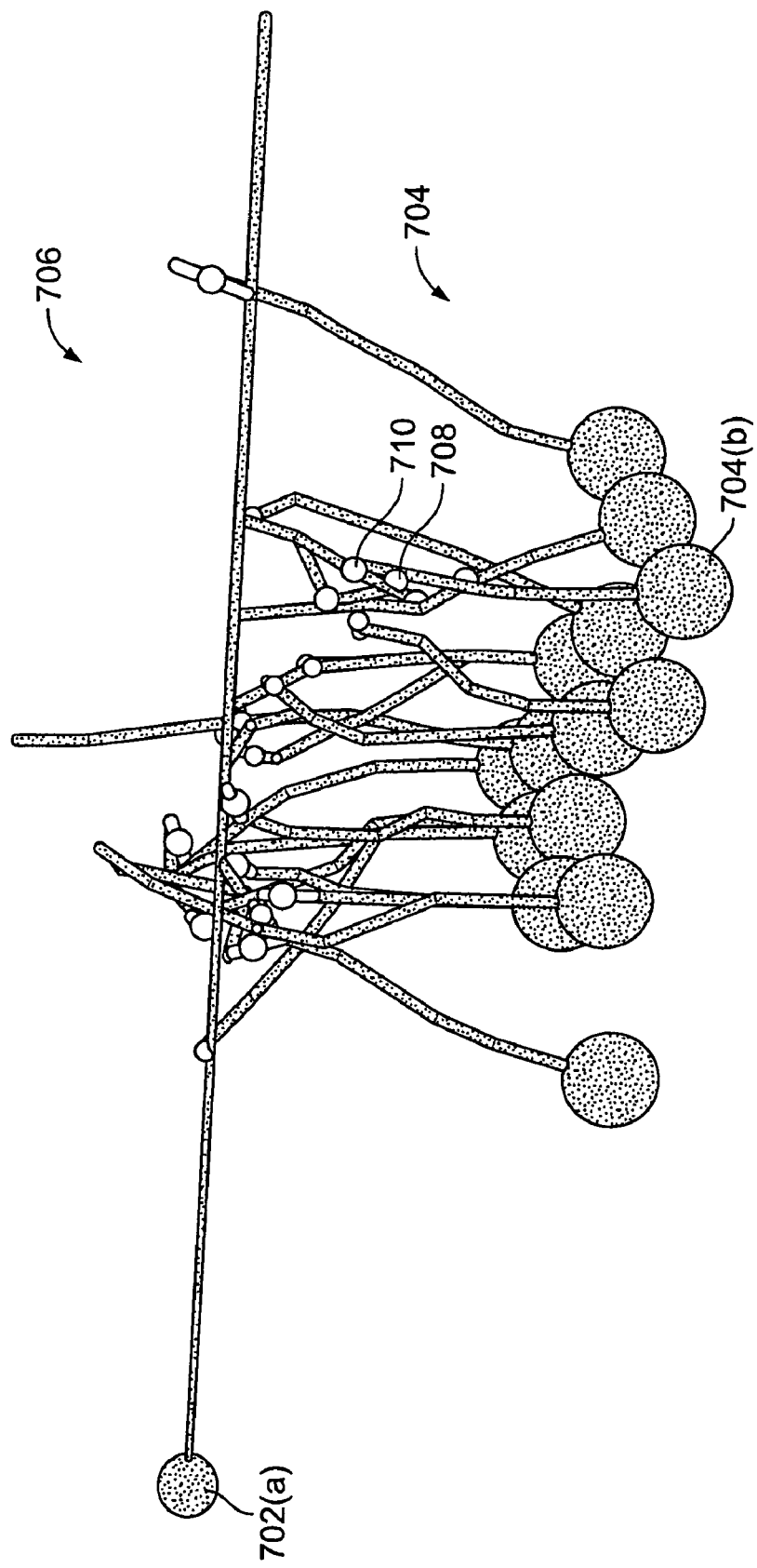

FIG. 7c is a block diagram of the simulated neural circuit 706 that illustrates individual neuron 702(a) of the output array 702 and the individual neurons of the input array 704 to which individual neuron 702(a) is connected in isolation. As illustrated in FIG. 7c, individual neuron 702(a) of the output array 702 is connected to fourteen of the simulated neurons of the input array 704. As further illustrated in FIG. 7c, multiple connections may exist between the individual simulated neuron 702(a) and an individual simulated neuron of the input array 704. For example, the individual neuron 702(a) is connected to individual neuron 704(b) at both connection 708 and connection 710.

Figure 7D:
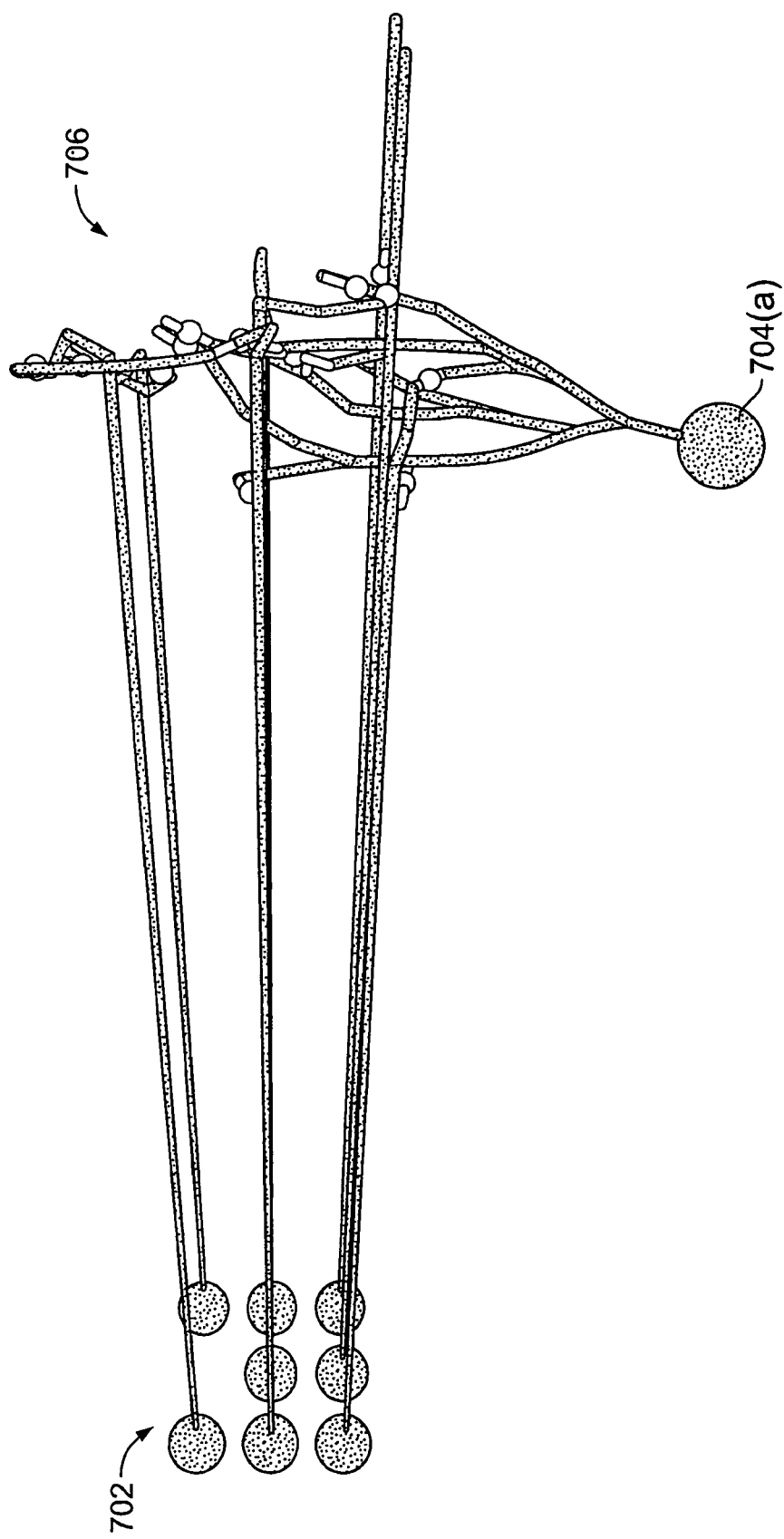

FIG. 7d is a block diagram of the simulated neural circuit 706 that illustrates individual neuron 704(a) of the input array 704 and the individual neurons of the output array 702 to which individual neuron 704(a) is connected in isolation. As illustrated in FIG. 7d, individual neuron 704(a) of the input array is connected to eight of the simulated neurons of the output array 702.

Figure 8A:
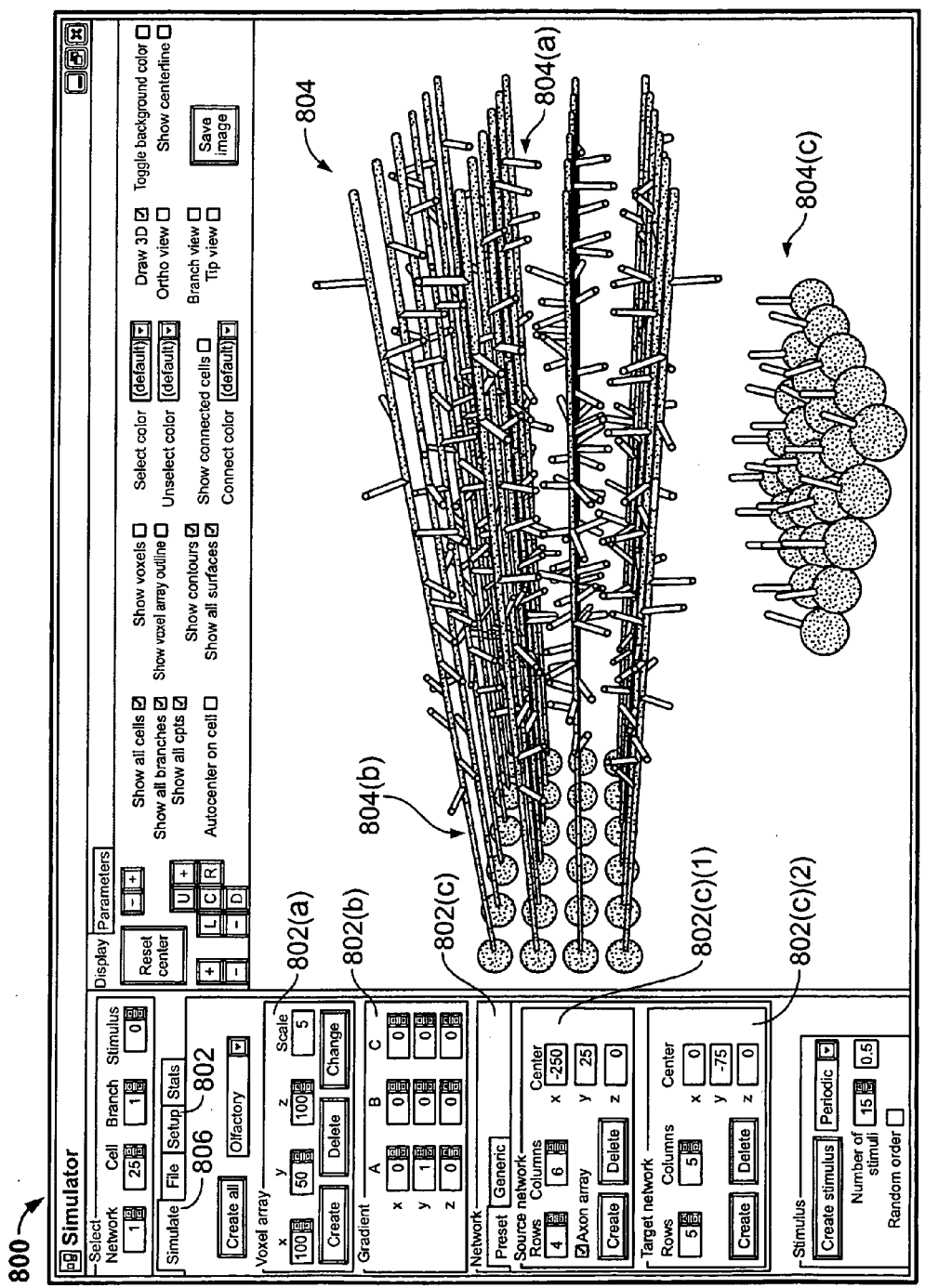
FIGS. 8a-8c are screenshots of a graphical user interface of a system for generating simulated neural circuits.

FIG. 8a is a screenshot of a GUI 800 for growing simulated neural circuits using, for example, a system for growing simulated neural circuits such as the system for growing simulated neural circuits illustrated in FIG. 12 and discussed more fully below. Like the GUI 200 of FIGS. 2a-2c, GUI 800 includes, among other features, a setup control tab 802, a simulation pane 804, and a simulate tab 806.

More particularly, the setup control tab 802 includes, among other features, a voxel array setup control 802(a), a gradient setup control 802(b), and a simulated neural circuit setup control 802(c). The voxel array setup control 802(a) enables a user to specify the dimensions of a voxel space in which to grow a simulated neural circuit as well as the size (i.e., scale) of each voxel in the voxel space. As illustrated in FIG. 8a, the voxel array setup control 802(a) specifies a voxel space of one hundred voxels by fifty voxels by one hundred voxels for growing a simulated neural circuit, with each voxel being a five by five unit cube.

The gradient setup control 802(b) enables a user to specify one or more gradients of simulated chemotropic substances (e.g., attractants or repellants) to be generated within the voxel space. As illustrated in FIG. 8a, the gradient setup control 802(b) enables a user to specify the magnitudes and orientations of up to three different three-dimensional gradients of simulated attractants and/or repellants (e.g., gradient A, gradient B, and/or gradient C). While the gradient setup control 802(b) illustrated in FIG. 8a only enables a user to specify three gradients of simulated attractants and/or repellants, in some implementations, additional gradients of attractants and/or repellants may be generated. Furthermore, in some implementations, the spatial patterns of simulated attractants and/or repellants generated in the voxel space may not be limited to gradients. Rather, other spatial patterns of attractants and/or repellants, such as, for example, stratifications, also may be generated in the voxel space.

The simulated neural circuit setup control 802(c) includes an output array setup control 802(c)(1) that enables a user to specify the number of rows and columns as well as the initial positions of simulated output neurons for an output array of simulated neurons. In addition, the simulated neural circuit setup control 802(c) includes an input array setup control 802(c)(2) that enables a user to specify the number of rows and columns as well as the initial positions of simulated input neurons for an input array of simulated neurons. As illustrated in FIG. 8a, the output array setup control 802(c)(1) specifies that the output array of simulated neurons is to include four rows and six columns of simulated output neurons and the input array setup control 802(c)(2) specifies that the input array of simulated neurons is to include five rows and five columns of simulated input neurons.

The simulation pane 804 presents a visual representation of the simulated neural circuit 804(a) specified by the parameters entered in the setup tab 802. More particularly, the simulation pane 804 includes a visual representation of an output array 804(b) of simulated output neurons and an input array 804(c) of simulated input neurons. As illustrated in FIG. 8a, the output array 804(b) of simulated neurons is a four by six array 804(b) of simulated output neurons as specified in the output array setup control 802(c)(1). Similarly, the input array 804(c) of simulated neurons is a five by five array 804(c) of simulated input neurons as specified in the input array setup control 802(c)(2).

Figure 8B:
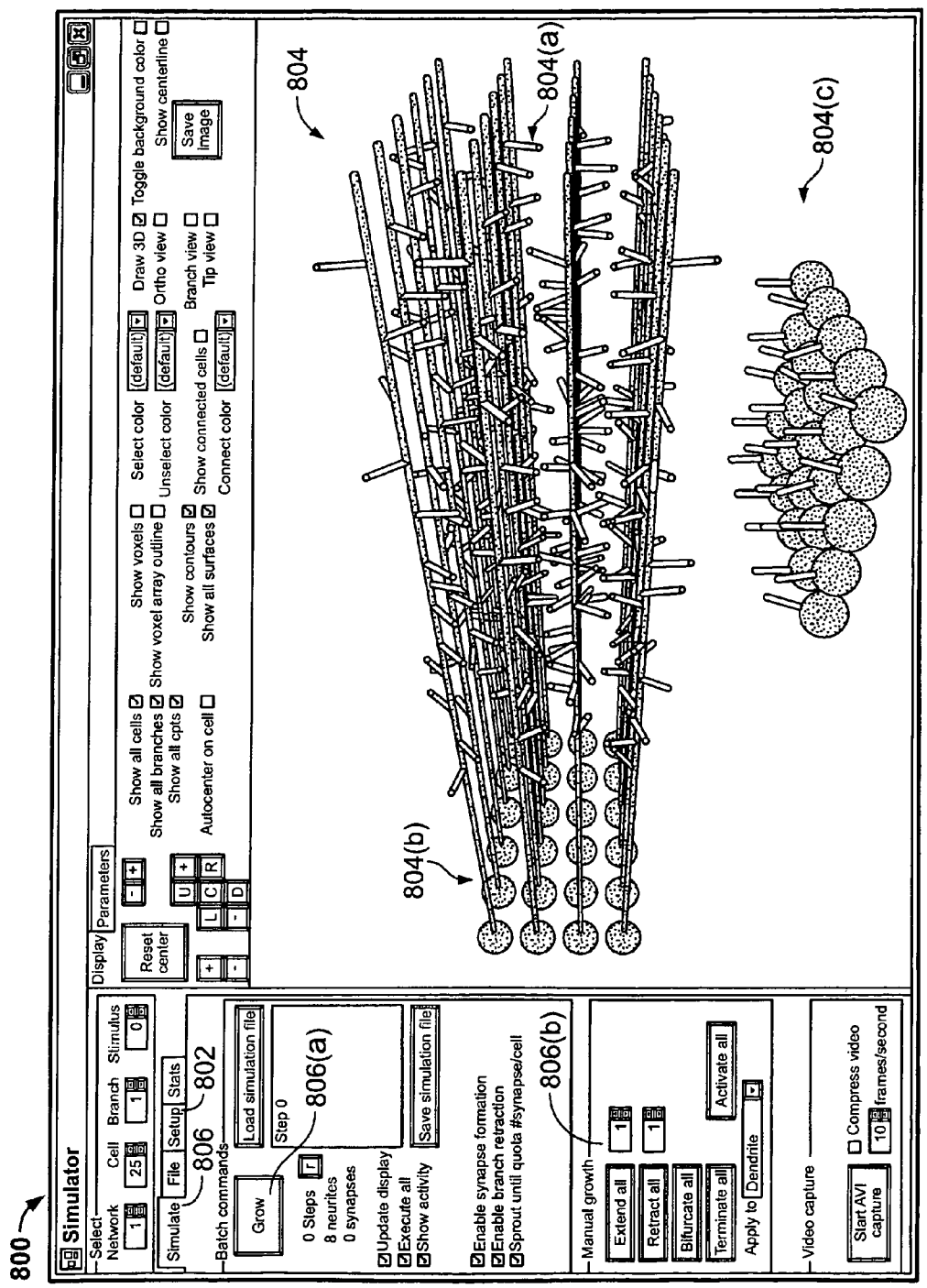

As with GUI 200 of FIGS. 2a-2c, the GUI 800 also includes a simulate tab 806 that enables a user to grow and connect the axons of the output array 804(b) and the dendrites of the input array 804(c) to form a simulated neural circuit. FIG. 8b is a screenshot of the GUI 800 with the simulate tab 806 selected. As illustrated in FIG. 8b, the simulate tab 806 includes, among other features, a grow button 806(a) and a manual growth control 806(b). Selection of the grow button 806(a) causes the axons of the output array 804(b) and the dendrites of the input array 804(c) to grow. For example, when the grow button 806(a) is selected, a growth state (e.g., bifurcate, extend, retract, terminate, or rest) may be selected for each active axonal segment of the output array 804(b) and each active dendritic segment of the input array 804(c). Thereafter, each active axonal segment and each active dendritic segment may be grown according to the selected growth states. In some implementations, selection of the grow button 806(a) may trigger a repeated progression through growth stages until the grow button 806(a) is selected again to signal that growth of simulated neural circuit 804(a) should be halted. In other implementations, selection of the grow button 806(a) may trigger only a single growth stage. In such implementations, repeated growth stages may be inspired through the repeated selection of the grow button 806(a).

The manual growth control 806(b) enables a user to manually control the growth of the simulated neural circuit 804(a). As illustrated in FIG. 8b, the manual growth control 806(b) enables a user to extend all of the active axonal and dendritic segments by a specified number of segments, to retract all of the active axonal and dendritic segments by a specified number of segments, to bifurcate all of the active axonal and dendritic segments, to terminate all of the active axonal and dendritic segments, or to activate all of the previously terminated axonal and dendritic segments.

Figure 8C:
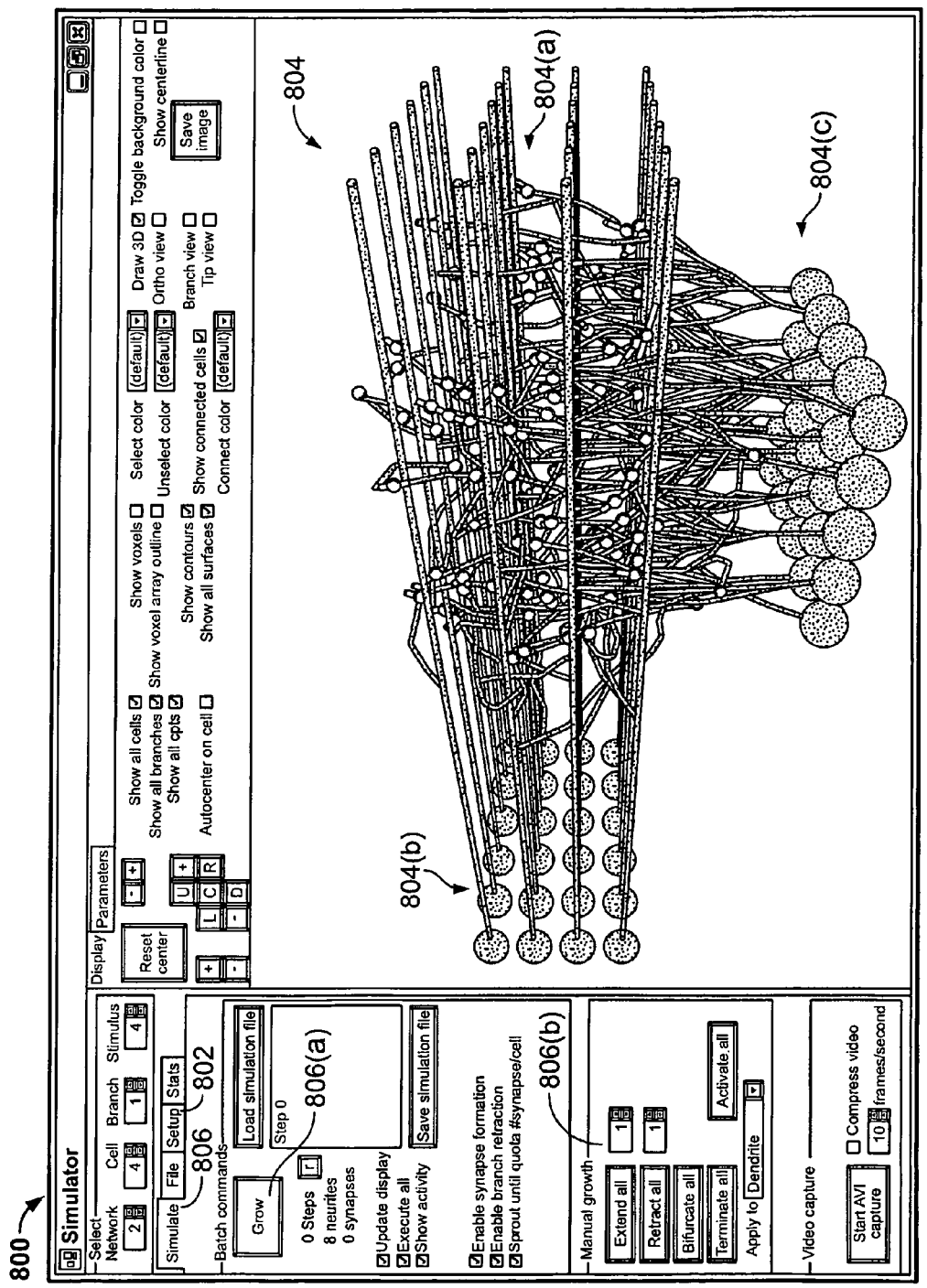

FIG. 8c is a screenshot of the GUI 800 after the simulate tab 806 has been used to grow the simulated neural circuit 804(a). As illustrated in FIG. 8c, the axons of the output array 804(b) of simulated neurons and the dendrites of the input array 804(c) of simulated neurons have been grown and connected to complete the simulated neural circuit 804(a) such that signals may be communicated from the output array 804(b) of simulated neurons to the input array 804(c) of simulated neurons through the connections between the output axons and the input dendrites.

Figure 9A:
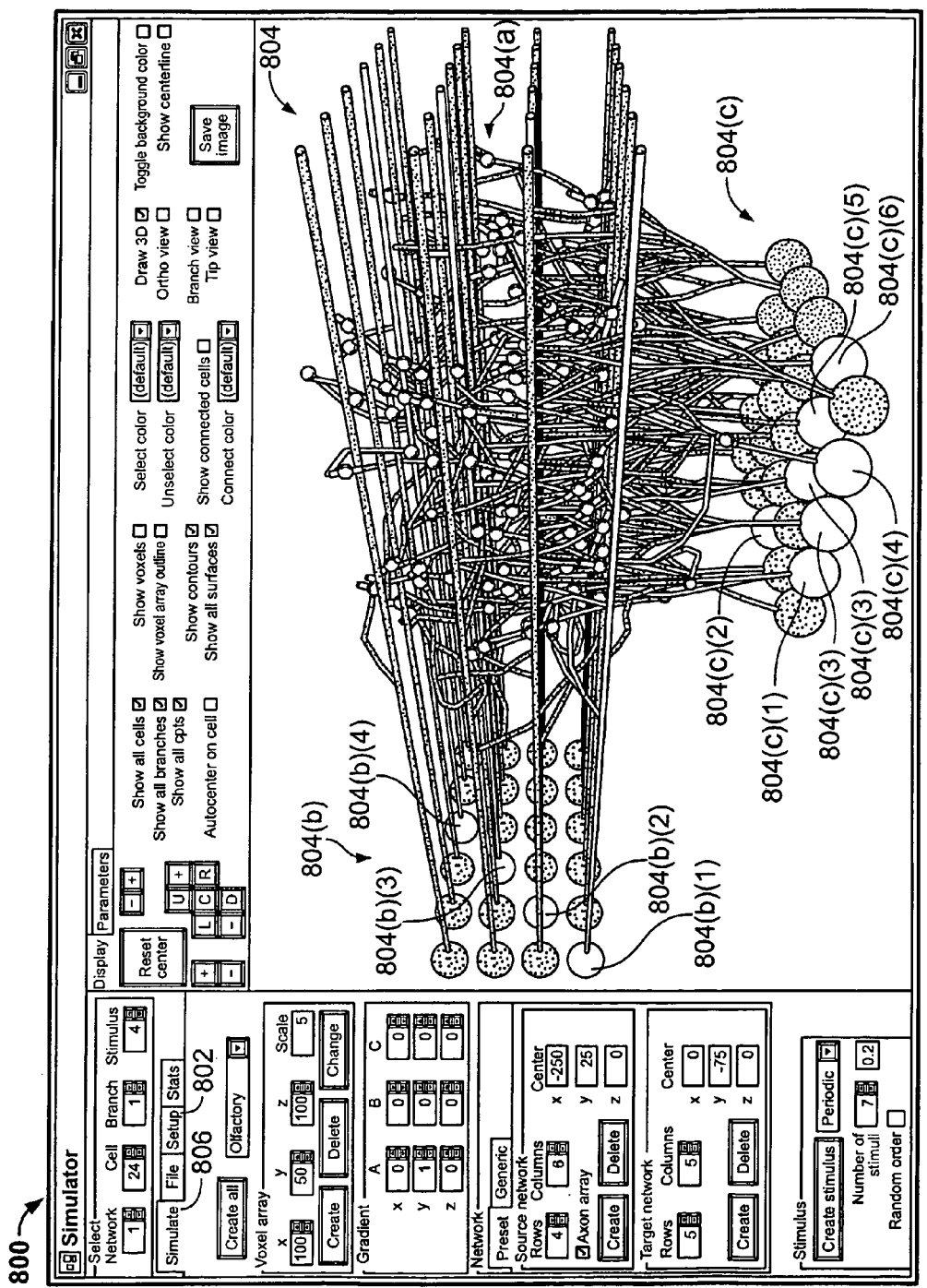
FIGS. 9a-9c are screenshots of the graphical user interface of FIG. 8 that illustrate the propagation of signals through simulated neural circuits.

FIG. 9a is a screenshot of the GUI 800 that illustrates the propagation of signals through the simulated neural circuit 804(a). For the purposes of illustration, active neural elements are depicted using light shading and inactive neural elements are depicted using dark shading. As illustrated in FIG. 9a, simulated output neurons 804(b)(1), 804(b)(2), 804(b)(3), and 804(b)(4) are active. Output signals generated by the active output neurons 804(b)(1), 804(b)(2), 804(b)(3), and 804(b)(4) are transmitted along their output axons and communicated to the simulated neurons of the input array 804(c) through connections between the output axons of the active output neurons 804(b)(1), 804(b)(2), 804(b)(3), and 804(b)(4) and dendrites of the simulated neurons of the input array 804(c).

If the concurrent activity in the axons connected to a particular dendrite is sufficiently high, the dendrite may fire. For example, in some implementations, a dendrite may fire in response to the sum of the magnitudes of the activity levels in the axons connected to the dendrite exceeding a threshold level or in response to a threshold number of the axons connected to the dendrite being active concurrently or within a certain time period. Additionally or alternatively, a dendrite may fire in response to a non-linear pattern or combination of concurrent activity in the axons connected to the dendrite.

The firing of a dendrite results in a signal being transmitted along the dendrite to the cell body of the simulated neuron to which the dendrite belongs. If the activity in the dendrites of a simulated neuron is sufficiently high, the neuron may fire. For example, in some implementations, a simulated neuron may fire in response to the sum of the magnitudes of the activity levels in the simulated neuron's dendrites exceeding a threshold level or in response to a threshold number of the simulated neuron's dendrites being active concurrently or within a certain time period. Additionally or alternatively, a simulated neuron may fire in response to a non-linear pattern or combination of concurrent activity in the simulated neuron's dendrites.

Figure 9B:
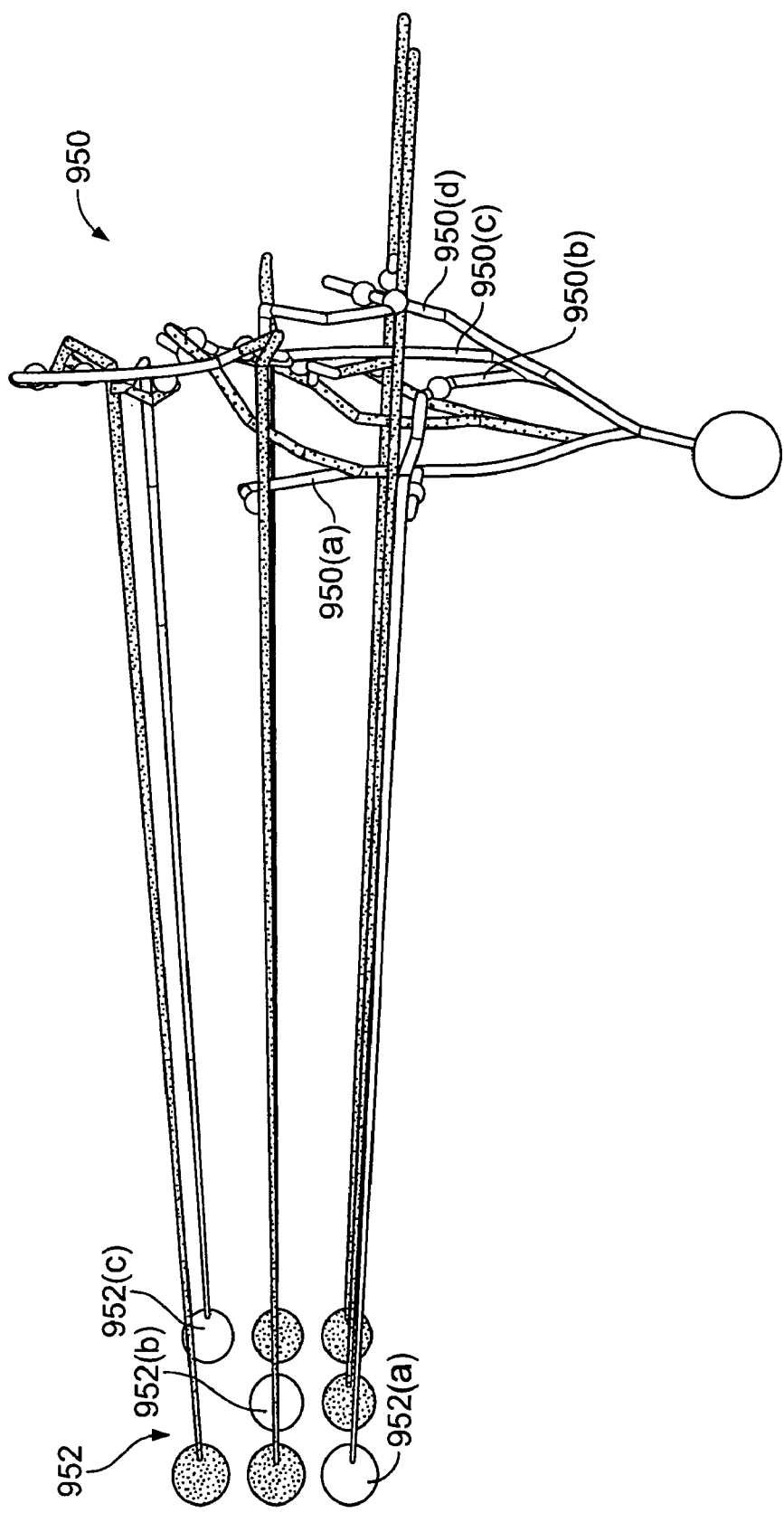
Figure 9C:
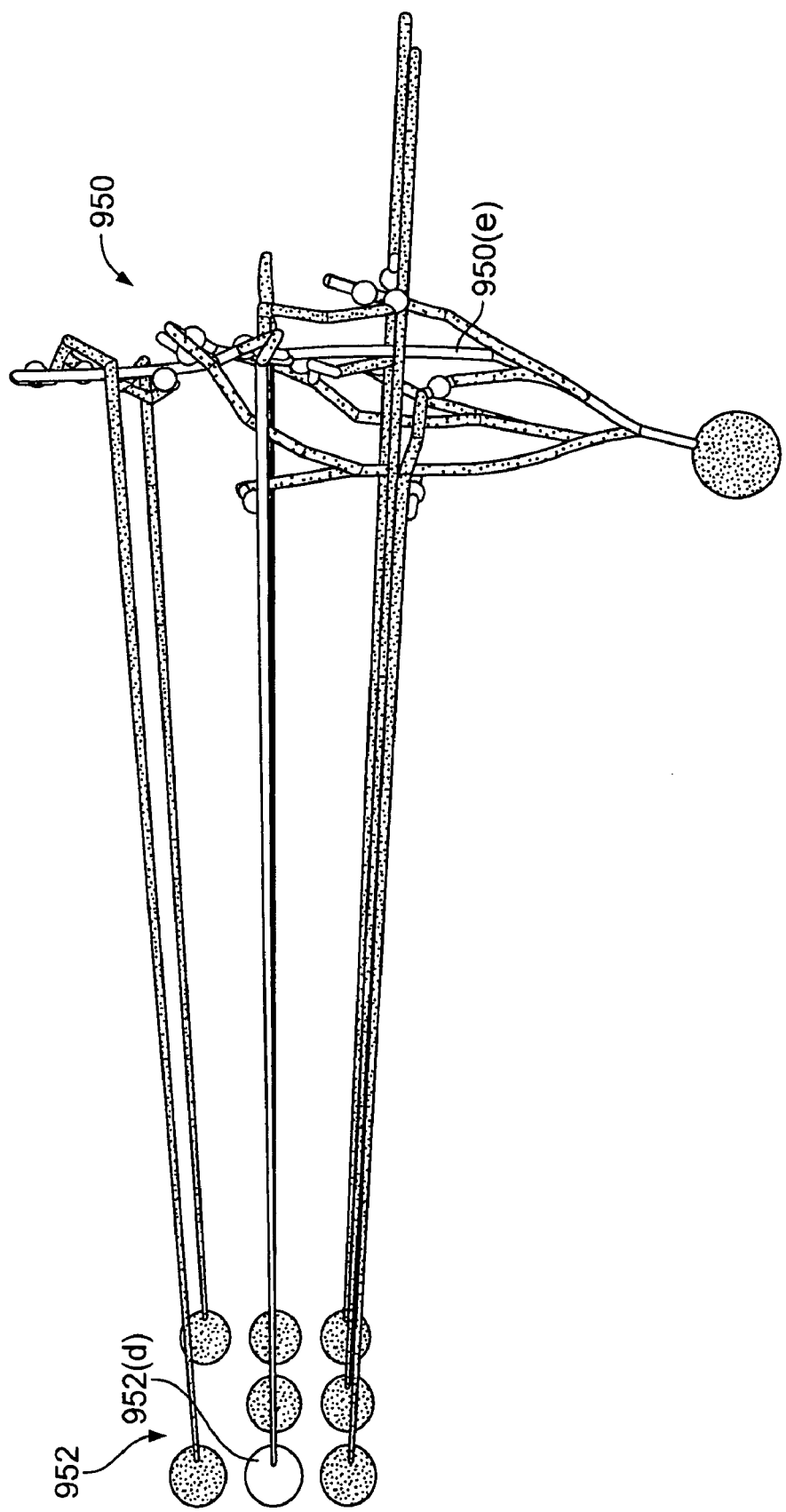

FIGS. 9b and 9c illustrate the response of an individual simulated neuron to activity in the axons connected to the simulated neuron's dendrites in greater detail. In particular, FIGS. 9b and 9c are block diagrams of an isolated simulated input neuron 950 of a simulated neural circuit (not illustrated) that is connected to a number of simulated output neurons 952 by connections between the input dendrites of the simulated input neuron 950 and the output axons of the simulated output neurons 952.

FIG. 9b illustrates the simulated input neuron 950 firing in response to activity in the axons connected to the dendrites of the neuron 950. As illustrated in FIG. 9b, simulated output neurons 952(a), 952(b), and 952(c) are active and therefore transmit output signals along their output axons. The output signals in the output axons of simulated output neurons 952(a), 952(b), and 952(c) generate activity in dendrites 950(a), 950(b), 950(c), and 950(d), and the activity in dendrites 950(a), 950(b), 950(c), and 950(d), in turn, causes simulated neuron 950 to fire.

In contrast to FIG. 9b, FIG. 9c illustrates the simulated input neuron 950 remaining inactive in response to activity in the axons connected to the dendrites of the neuron 950. As illustrated in FIG. 9c, the only simulated output neuron that is active is simulated output neuron 952(d). Therefore, only the output axon of output neuron 952(d) transmits an output signal to the dendrites of the simulated input neuron 950 and only dendrite 950(e) fires in response. Consequently, the activity in the dendrites of the simulated input neuron 950 is insufficient to trigger the simulated input neuron 950 to fire and the simulated input neuron 950 remains inactive.

Referring again to FIG. 9a, the output signals generated by the active simulated output neurons 804(b)(1), 804(b)(2), 804(b)(3), and 804(b)(4) are communicated through the simulated neural circuit 804(a) along the output axons of the active simulated neurons 804(b)(1), 804(b)(2), 804(b)(3), and 804(b)(4) and trigger the firing of numerous input dendrites of the simulated input neurons of the input array 804(c). In turn, the firing of the input dendrites results in the firing of simulated input neurons 804(c)(1), 804(c)(2), 804(c)(3), 804(c)(4), 804(c)(5), and 804(c)(6). That is to say, the propagation of the signals generated by the active simulated output neurons 804(b)(1), 804(b)(2), 804(b)(3), and 804(b)(4) through the simulated neural circuit 804(a) results in the firing of simulated input neurons 804(c)(1), 804(c)(2), 804(c)(3), 804(c)(4), 804(c)(5), and 804(c)(6).

In some implementations, activity in a simulated neural circuit generated in response to the activation of the simulated output neurons of the output array of the simulated neural circuit influences the growth and development of the simulated neural circuit. For example, as described farther below, activity in the neural circuit may influence the formation, stabilization, destabilization, and dissolution of connections between neural elements. Additionally or alternatively, in some implementations, the output axons of the simulated neurons of the output array are configured to release a simulated attractant in response to firing. Therefore, the concentration of simulated attractants will be greater in the vicinity of frequently active axons than in the vicinity of infrequently active axons. Accordingly, dendrites of the simulated neurons of the input array may be strongly attracted to frequently active axons. As a result, dendrites may grow toward and form connections with frequently active axons more often than dendrites grow toward and form connections with infrequently active axons. Consequently, in such implementations, the growth of simulated neural circuits may be said to be activity dependent.

Additionally, the strength of the connections between axons and dendrites in a simulated neural circuit also may be influenced by activity in the simulated neural circuit. As described above, the strengthening and weakening of the weights of connections is compatible with the mechanisms described for maintaining and destabilizing synaptic contacts, but is not necessary for wiring the neural circuit. For example, when both an axon and a dendritic branch to which the axon is connected fire in response to a particular signal, the connection between the axon and the dendritic branch may be strengthened, where strengthening of the connection means that future activity in the axon has a relatively larger impact on activity generated in the dendritic branch in response. Similarly, when the firing of an axon and a dendritic branch to which the axon is connected triggers the firing of the cell body to which the dendritic branch belongs, the connection between the axon and the dendritic branch may be strengthened.

Connections between axons and dendritic branches also may be weakened as a result of activity in the simulated neural circuit. For example, when an axon fires in response to a signal, but a dendritic branch to which the axon is connected does not fire in response to the same signal, the connection between the axon and the dendritic branch may be weakened, where weakening of the connection means that future activity in the axon has a relatively smaller impact on activity generated in the dendritic branch in response. Similarly, if an axon does not fire but a dendritic branch to which the axon is connected and/or the cell body to which the dendritic branch belongs does fire, the connection between the axon and the dendritic branch may be weakened. Likewise, if the firing of an axon does not trigger the firing of a dendritic branch to which the axon is connected, but the cell body to which the dendritic branch belongs fires nevertheless, the connection between the axon and the dendritic branch may be weakened.

In this manner, connections that result in the propagation of a signal through a simulated neural circuit (e.g., from axon, to dendritic branch, to cell body) may be strengthened and connections that do not result in the propagation of a signal through a simulated neural circuit may be weakened.

Figure 10:
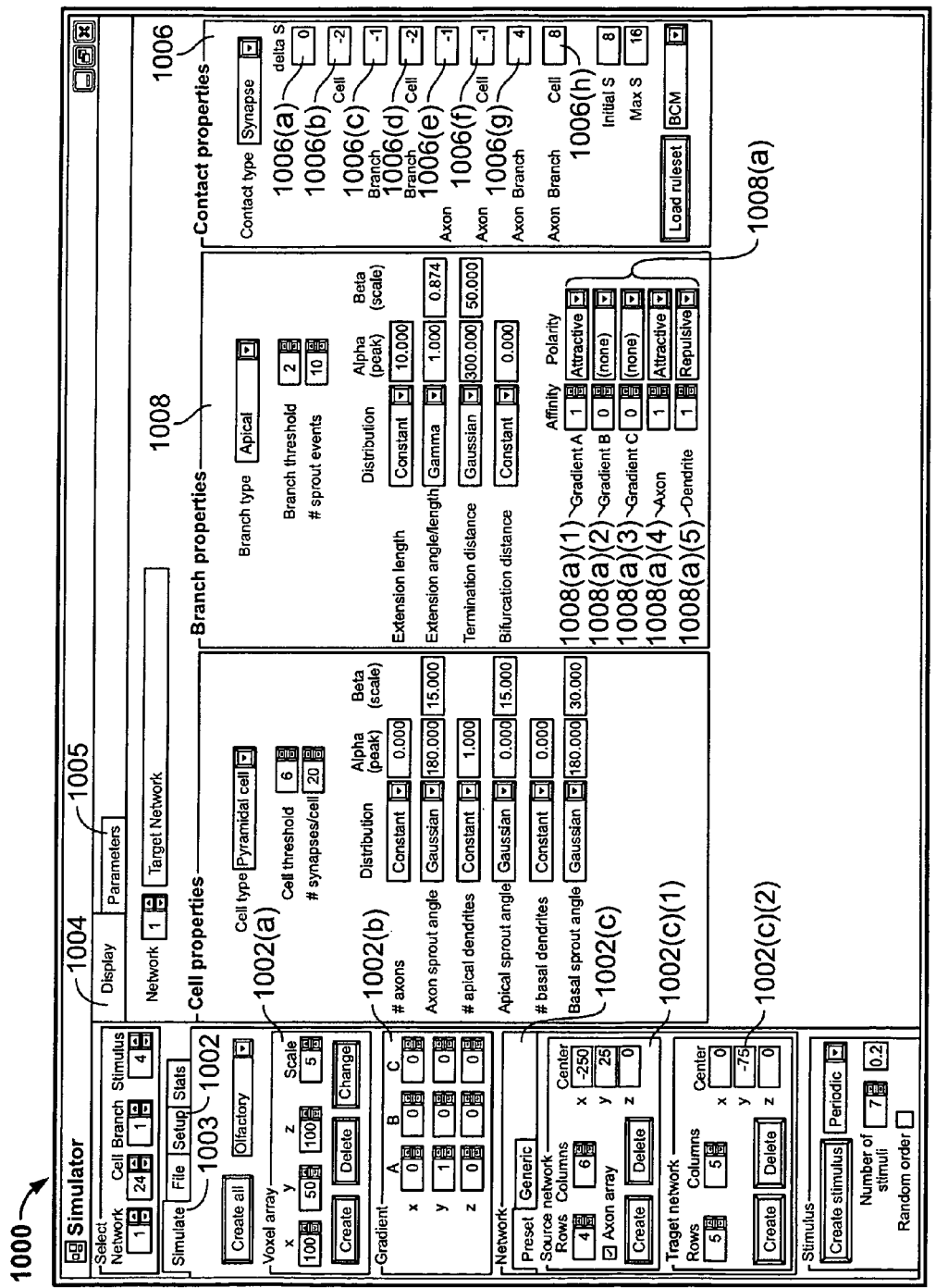
FIG. 10 is a screenshot of a graphical user interface for generating simulated neural circuits.

FIG. 10 is a screenshot of a GUI 1000 for growing a simulated neural circuit using, for example, a system for growing simulated neural circuits such as the system for growing simulated neural circuits illustrated in FIG. 12 and discussed more fully below. Like the GUIs 200 and 800 of FIGS. 2a-2c and 8a-8c, GUI 1000 includes, among other features, a setup control tab 1002, a simulate tab 1003, a display tab 1004, and a parameters tab 1005.

The setup control tab 1002 of GUI 1000 enables a user to specify the initial components of a simulated neural circuit to be grown as well as the properties of the environment in which the simulated neural circuit will be grown and includes, among other features, a voxel array setup control 1002(a), a gradient setup control 1002(b), and a simulated neural circuit setup control 1002(c). The voxel array setup control 1002(a) enables a user to specify the dimensions of a voxel space in which to grow a simulated neural circuit as well as the size (i.e., scale) of each voxel in the voxel space. The gradient setup control 1002(b) enables a user to specify one or more three-dimensional gradients of simulated chemotropic substances to be generated within the voxel space. The simulated neural circuit setup control 1002(c) includes an output array setup control 1002(c)(1) that enables a user to specify the number of rows and columns as well as the initial positions of simulated output neurons for an output array of simulated neurons. In addition, the simulated neural circuit setup control 1002(c) includes an input array setup control 1002(c)(2) that enables a user to specify the number of rows and columns as well as the initial positions of simulated input neurons for an input array of simulated neurons.

A user can toggle between display tab 1004 and parameters tab 1005. When display tab 1004 is selected, a simulation pane (not shown) similar to the simulation panes 204 and 804 of FIGS. 2a-2c and 8a-8c is displayed. When parameters tab 1005 is selected, various controls are displayed that enable a user to specify different properties of the simulated neural circuit to be grown using GUI 1000 and initialized using setup control tab 1002. For example, when parameters tab 1005 is selected, a contact properties control 1006 is displayed that enables a user to specify the extent to which activity in the simulated neural circuit influences the stability of connections between axons and dendrites in the simulated neural circuit. In addition, a branch properties control 1008 that enables a user to specify various different properties of dendritic branches of the simulated neural circuit is displayed when parameters tab 1005 is selected.

As illustrated in FIG. 10, the contact properties control 1006 includes eight fields, each corresponding to one of the eight possible combinations of axon, branch, and neuron activity: a no activity field 1006(a), an active neuron field 1006(b), an active branch field 1006(c), an active branch and active neuron field 1006(d), an active axon field 1006(e), an active axon and active neuron field 1006(f), an active axon and active branch field 1006(g), and an active axon, active branch, and active neuron field 1006(h). These fields may be leveraged to define how activity in the simulated neural circuit impacts the stability of connections within the simulated neural circuit. As described above, stability may be a state variable of the connection between two elements that can be increased or decreased as a function of the relationships of activity (e.g., temporal correlation) of the two elements. If stability drops below some parameterized value, the connection between the elements may be removed.

The no activity field 1006(a) defines how the stability of a connection between an axon and a dendritic branch should be impacted when neither the axon nor the dendritic branch nor the neuron to which the dendritic branch belongs fire. As illustrated in FIG. 10, the stability of the connection between an axon and a dendritic branch is to remain unchanged when the neither the axon nor the dendritic branch nor the neuron to which the dendritic branch belongs fire.

The active neuron field 1006(b) defines how the stability of a connection between an axon and a dendritic branch should be impacted when neither the axon nor the dendritic branch fire but the neuron to which the dendritic branch belongs fires. As illustrated in FIG. 10, the stability of the connection between an axon and a dendritic branch is to be decremented by two when neither the axon nor the dendritic branch fire but the neuron to which the dendritic branch belongs fires.

The active branch field 1006(c) defines how the stability of a connection between an axon and a dendritic branch should be impacted when the dendritic branch fires but neither the axon nor the neuron to which the dendritic branch belongs fires. As illustrated in FIG. 10, the stability of the connection between an axon and a dendritic branch is to be decremented by one when the dendritic branch fires but neither the axon nor the neuron to which the dendritic branch belongs fires.

The active branch and active neuron field 1006(d) defines how the stability of a connection between an axon and a dendritic branch should be impacted when the dendritic branch and the neuron to which the dendritic branch belongs fire but the axon does not fire. As illustrated in FIG. 10, the stability of the connection between an axon and a dendritic branch is to be decremented by two when the dendritic branch and the neuron to which the dendritic branch belongs fire but the axon does not fire.

The active axon field 1006(e) defines how the stability of a connection between an axon and a dendritic branch should be impacted when the axon fires but neither the dendritic branch nor the neuron to which the dendritic branch belongs fires. As illustrated in FIG. 10, the stability of the connection between an axon and a dendritic branch is to be decremented by one when the axon fires but neither the dendritic branch nor the neuron to which the dendritic branch belongs fire.

The active axon and active neuron field 1006(f) defines how the stability of a connection between an axon and a dendritic branch should be impacted when both the axon and the neuron to which the dendritic branch belongs fire but the dendritic branch does not fire. As illustrated in FIG. 10, the stability of the connection between an axon and a dendritic branch is to be decremented by one when both the axon and the neuron to which the dendritic branch belongs fire but the dendritic branch does not fire.

The active axon and active branch field 1006(g) defines how the stability of a connection between an axon and a dendritic branch should be impacted when both the axon and the dendritic branch fire but the neuron to which the dendritic branch belongs does not fire. As illustrated in FIG. 10, the stability of the connection between an axon and a dendritic branch is to be strengthened by four when both the axon and the dendritic branch fire but the neuron to which the dendritic branch belongs does not fire.

The active axon, active branch, and active neuron field 1006(h) defines how the stability of a connection between an axon and a dendritic branch should be impacted when the axon, the dendritic branch, and the neuron to which the dendritic branch belongs all fire. As illustrated in FIG. 10, the stability of the connection between an axon and a dendritic branch is to be strengthened by eight when the axon, the dendritic branch, and the neuron to which the dendritic branch belongs all fire.

Of course, the values specified in the no activity field 1006(a), the active neuron field 1006(b), the active branch field 1006(c), the active branch and active neuron field 1006(d), the active axon field 1006(e), the active axon and active neuron field 1006(f), the active axon and active branch field 1006(g), and the active axon, active branch, and active neuron field 1006(h) are not limited to those values illustrated in FIG. 10. Rather, any value may be specified in each of these fields.

Among other features, the branch properties control 1008 includes an affinity definition control 1008(a) that enables a user to specify dendritic branch affinities for different simulated chemotropic substances and/or neural elements as the simulated neural circuit grows. For example, the affinity definition control 1008(a) includes gradient A affinity definition control 1008(a)(1), gradient B affinity definition control 1008(a)(2), and gradient C affinity definition control 1008(a)(3), each of which enables a user to specify a polarity (i.e., attractive or repulsive) and relative magnitude of dendritic branch affinity for a corresponding gradient of a simulated chemotropic substance initialized using the gradient setup control 1002(b). As illustrated in FIG. 10, gradient A definition control 1008(a)(1) specifies that the dendritic branches of the simulated neural circuit are attracted to the simulated chemotropic substance of gradient A with a relative magnitude of 1.

In addition, the affinity definition control 1008(a) also includes axon affinity definition control 1008(a)(4) and dendrite affinity definition control 1008(a)(5) which enable a user to specify polarities and relative magnitudes of dendritic branch affinities for axons and dendrites respectively. As illustrated in FIG. 10, axon affinity definition control 1008(a)(4) specifies that the dendritic branches of the simulated neural circuit are attracted to axons of the simulated neural circuit with a relative magnitude of 1 and dendritic affinity definition control 1008(a)(5) specifies that dendritic branches of the simulated neural circuit are repelled by other dendritic branches of the simulated neural circuit with a relative magnitude of 1.

Additional and/or more specific dendritic branch affinity controls also may be presented to a user For example, controls that enable a user to specify affinities of specific types of dendritic branches for different chemotropic substances and/or neural elements may be presented. Additionally or alternatively, controls that enable a user to specify affinities of dendritic branches that extend from specific types of cell bodies for different chemotropic substances and/or neural elements may be presented.

In some implementations, controls that enable a user to specify affinities of axons or other neural elements for different chemotropic substances and/or neural elements also may be presented.

Figure 11:
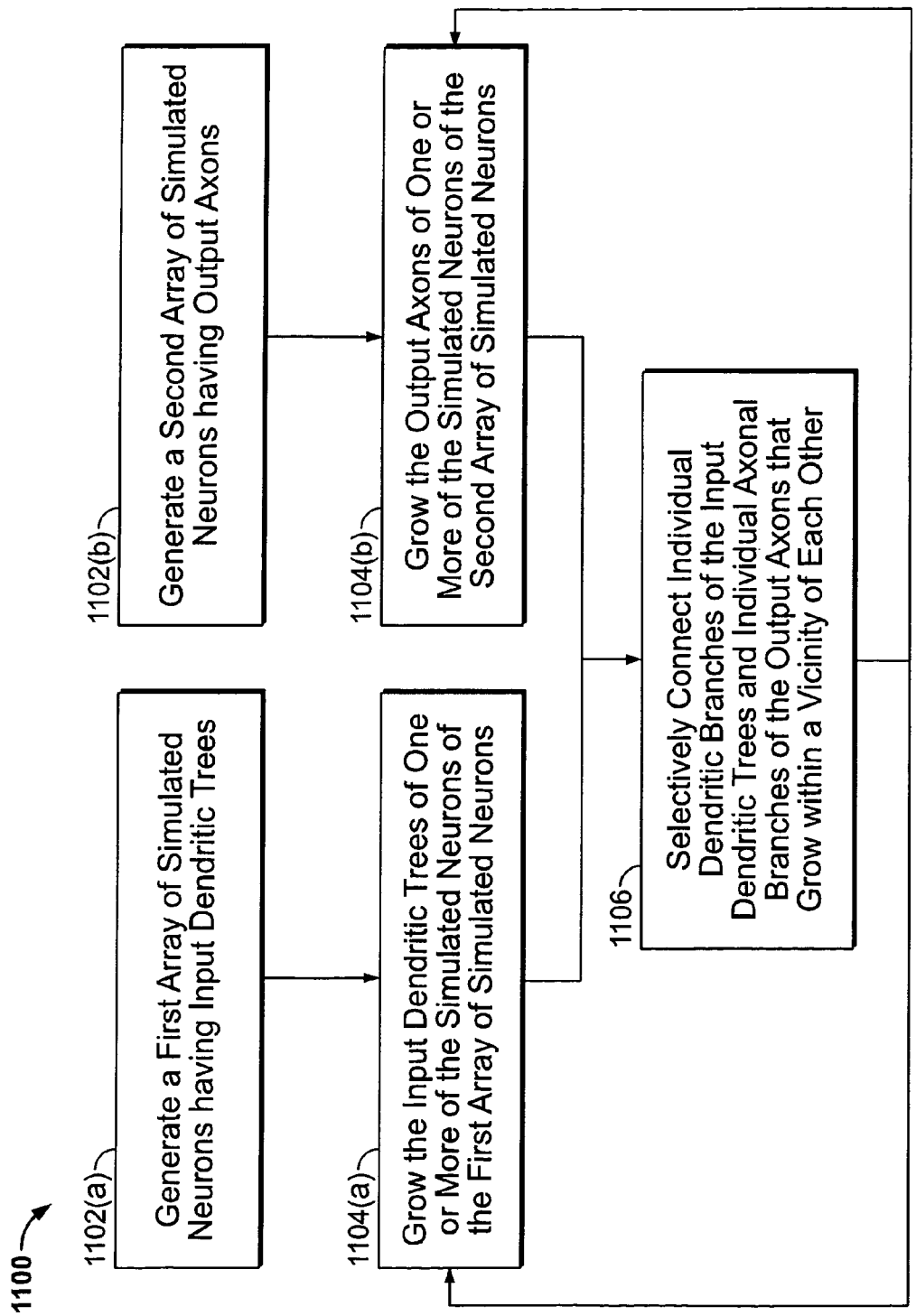
FIG. 11 is a flow chart of a process for generating a simulated neural circuit.

FIG. 11 is a flow chart of a process 1100 for growing a simulated neural circuit. The process 1100 begins by generating a first array of simulated neurons having input dendritic trees (1102(a)) and generating a second array of simulated neurons having output axons (1102(b)). Thereafter, the input dendritic trees of one or more of the simulated neurons of the first array are grown (1104(a)) and the output axons of one or more of the second array of simulated neurons are grown (1104(b)). In some instances, as the input dendritic trees and the output axons are grown, individual dendritic branches of the dendritic trees and individual axonal branches of the output axons may grow towards each other. When individual dendritic branches and individual axonal branches grow within a vicinity of each other, they may be selectively connected to each other to form a neural circuit (1106).

Figure 12:
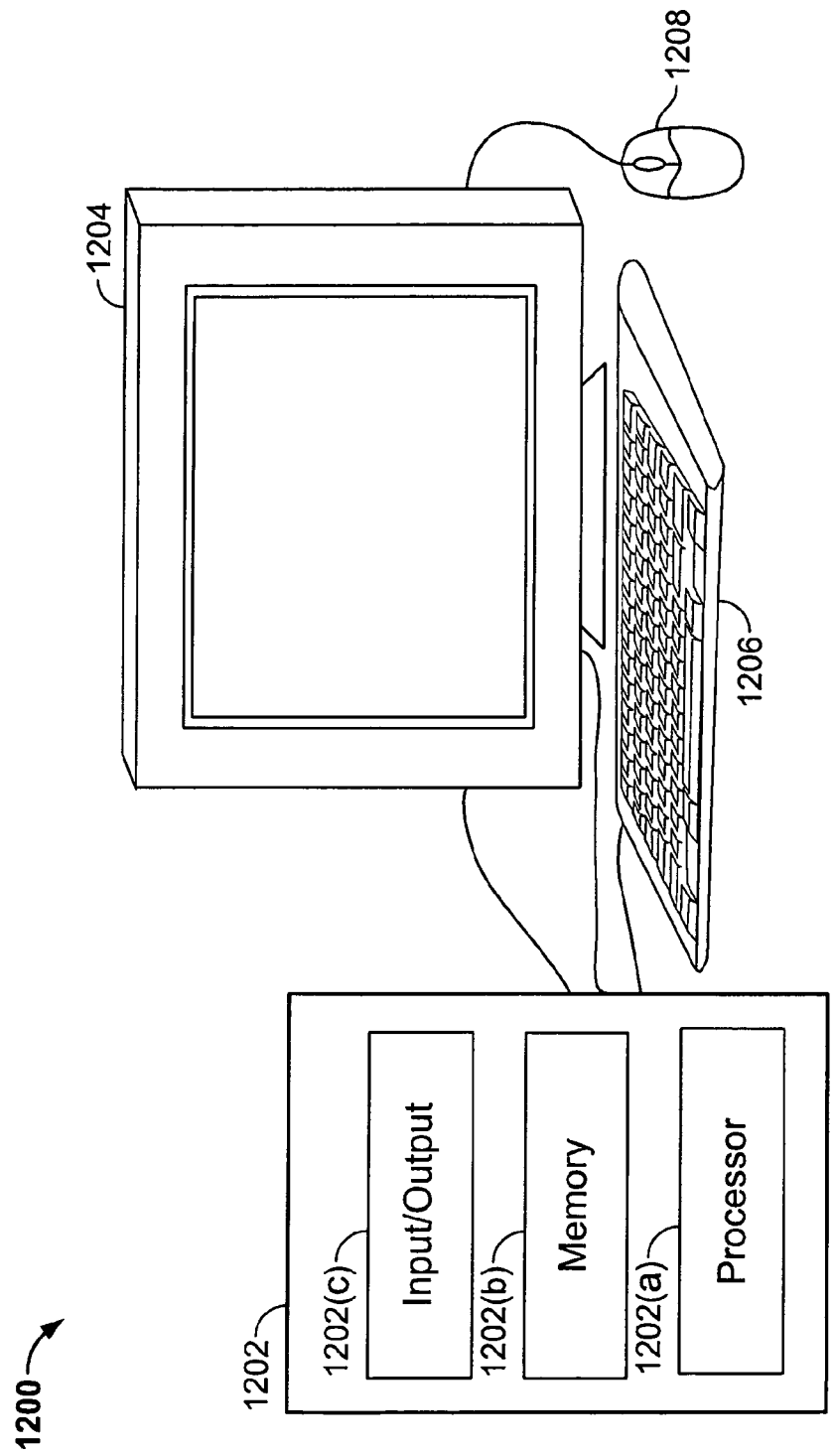
FIG. 12 is a block diagram of a system for generating simulated neural circuits.

FIG. 12 is a block diagram of an exemplary system 1200 for growing simulated neural networks. Briefly, the system includes a computer 1202, a display 1204, a keyboard 1206, and a pointing device 1208 (e.g., a mouse).

The computer 1202 may be implemented by, for example, a general purpose computer capable of responding to and executing instructions in a defined manner, a personal computer, a special-purpose computer, a workstation, a server, a notebook or laptop computer, a personal digital assistant (PDA), a wireless telephone, a device, a component, other equipment, or some combination of these items that is capable of responding to and executing instructions. Particular implementations may not include the display 1204, the keyboard 1206 and/or the pointing device 1208.

As illustrated in FIG. 12, computer 1200 includes one or more processors 1202(a) that process instructions, one or more memory/storage devices 1202(b) that store data and various programs such as operating systems and application programs, and one or more input/output (I/O) interfaces 1202(c) that enable computer 1202 to communicate with one or more other devices, such as, for example, display 1204, keyboard 1206, pointing device 1208, and/or a communications network (e.g., a local area network (LAN), a wide area network (WAN), or the Internet (not shown)).

The processor 1202(a) may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the processor 1202(a).

Memory 1202(b) may include a volatile memory device such as a random access memory (RAM) for storing computer instructions and data for processing by processor 1202(a). In addition, memory 1202(b) also may include a non-volatile memory device such as a read-only memory (ROM) for storing invariant low-level system code or data for basic system functions such as basic I/O, startup, or reception of keystrokes from keyboard 1206. Furthermore, memory 1202(b) may store computer executable instructions for an operating system and/or application programs, including, for example, applications for growing simulated neural circuits, as well as data files. During operation, computer executable instructions may be loaded into a region of RAM in memory 1202(b) so that they may be accessed by processor 1202(a) in order to execute software programs.

I/O interfaces 1202(c) may include a display interface that enables computer 1202 to render graphics, images, and/or text on display 1204. In addition, I/O interfaces 1202(c) may include a keyboard interface that enables computer 1202 to receive keystroke input from keyboard 1206, a pointing device interface that enables computer 1202 to receive input from pointing device 108, and a communications interface that enables computer 1202(c) to exchange data or other information with a communications network (not shown).

The system 1200 for growing simulated neural circuits of FIG. 12 is merely an example of a system for growing simulated neural circuits. Accordingly, other systems, configurations, and/or architectures also may be used to implement systems for growing simulated neural circuits.

As described above, the introduction of a set of local rules that guide the appearance and disappearance of connections in a simulated neural circuit based on activity in the simulated neural circuit may enable an elegant process for wiring the simulated neural circuit without requiring that all of the potential connections between the elements of the neural circuit be implemented in an initial predefined pattern.

Figure 13:
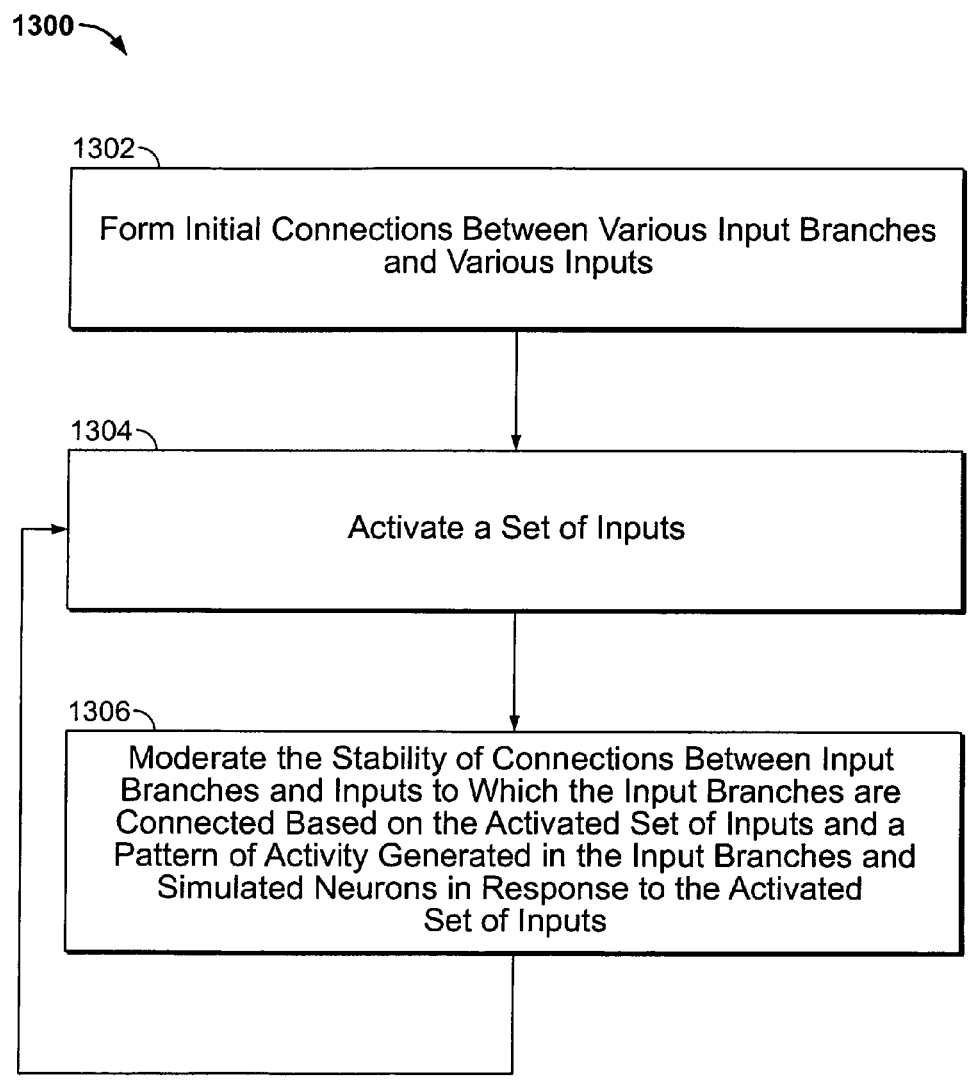
FIG. 13 is a flow chart of a process for wiring a simulated neural circuit.

By way of summary, FIG. 13 is a flow chart of a process 1300 for wiring a simulated neural circuit by using rules that guide the appearance and disappearance of connections in a simulated neural circuit based on activity in the simulated neural circuit. As described above, the simulated neural circuit may include a number of simulated neurons that have input branches that are configured to enable the formation of connections with different inputs. In addition, the input branches of the simulated neurons may be configured to activate in response to activity in the inputs to which the input branches are connected. Similarly, the simulated neurons may be configured to activate in response to activity in their input branches.

The process 1300 begins by selectively forming initial connections between various input branches and various inputs (1302). For example, the input branches and/or the various inputs may be grown, and connections may be formed between input branches and inputs that grow to within a certain proximity of each other.

Eventually, activity is received and/or generated in the inputs (1304) resulting in a pattern of activity that propagates through the input branches and that ultimately may result in the firing of one or more of the simulated neurons. As this pattern of activity propagates through the input branches and simulated neurons of the simulated neural circuit, the stability of the connections between input branches and inputs is moderated (e.g., increased or decreased) based on the pattern of activity generated in the input branches and simulated neurons (1306).

In some implementations, a set of local rules may define how the stability of connections between input branches and inputs is impacted by the pattern of activity generated in the input branches and simulated neurons. For example, the rules outlined in the following table may define whether to increase or reduce the stability of a connection between a particular input branch and a particular input:

| | |
|---|---|
| Reduce stability of connection between input branch and input when: | the input was not activated, the input branch remained inactive in response to the activated set of inputs, and the simulated neuron to which the input branch belongs activated in response to the activated set of inputs |
| | the input was activated, the input branch was activated in response to the activated set of inputs, and the simulated neuron to which the input branch belongs remained inactive in response to the activated set of inputs |
| | the input was not activated, the input branch was activated in response to the activated set of inputs, and the simulated neuron to which the input branch belongs was activated in response to the activated set of inputs |
| | the input was activated, the particular input branch remained inactive in response to the activated set of inputs, and the simulated neuron to which the input branch belongs remained inactive in response to the activated set of inputs |
| | the input was among the activated set of inputs, the input branch remained inactive in response to the activated set of inputs, and the simulated neuron to which the input branch belongs remained inactive in response to the activated set of inputs |
| Increase stability of connection between input branch and input when: | the input was among the activated set of inputs, the input branch was activated in response to the activated set of inputs, and the simulated neuron to which the input branch belongs remained inactive in response to the activated set of inputs |
| | the input was among the activated set of inputs, the input branch was activated in response to the activated set of inputs, and the simulated neuron to which the input branch belongs was activated in response to the activated set of inputs |

In order to complete the wiring of the simulated neural circuit, the inputs repeatedly may be subjected to different patterns of activity (1304) and the connections between input branches and inputs may be moderated continually based on the resultant patterns of activity in the input branches and simulated neurons (1306). As the process progresses, the wiring of the circuit may evolve, with new connections being formed and existing connections disintegrating when their stability drops below some parameterized value.

The systems and/or techniques for growing simulated circuits described above may be used to design simulated neural circuits for real-life applications. For example, after growing a simulated neural circuit using the systems and/or techniques described above, the grown simulated neural circuit may be implemented in digital logic or fabricated in an integrated circuit (IC) for use in processing or other applications. Furthermore, employing the systems and techniques for growing simulated neural circuits described above to simulate the growth of biological neurons may enable researchers and scientists to develop a better understanding of the mechanisms that guide and control the growth of biological neurons.

The systems and techniques described above are not limited to any particular hardware or software configuration. Rather, they may be implemented using hardware, software, or a combination of both. In addition, the methods and processes described may be implemented as computer programs that are executed on programmable computers comprising at least one processor and at least one data storage system. The computer programs may be implemented in a high-level compiled or interpreted programming language, or, additionally or alternatively, the computer programs may be implemented in assembly or other lower level languages, if desired. Such computer programs typically will be stored on computer-usable storage media or devices (e.g., CD-Rom, RAM, or magnetic disk). When read into a processor of a computer and executed, the instructions of the programs may cause a programmable computer to carry out the various operations described above.

A number of implementations have been described. Nevertheless, it will be understood that various modifications and implementations may be made. For example, while techniques for growing simulated neural circuits have been described largely in the context of simultaneously growing and interconnecting arrays of simulated neurons, the simulated neurons that compose simulated neural circuits need not be configured in arrays. Furthermore, useful results still may be achieved if steps of the disclosed techniques are performed in a different order and/or if components in the disclosed systems are combined in a different manner and/or replaced or supplemented by other components. Accordingly, other implementations are within the scope of the following claims.

What is claimed is:

1. A computer implemented method for generating simulated neurons, the method comprising:
generating a three-dimensional voxel space in which to generate a simulated neural circuit, the voxel space including a plurality of voxels that store localized information;
embedding a plurality of simulated branched neurons in the voxel space, each simulated neuron having one or more branches, each of the branches occupying at least one of the voxels;
generating one or more of the branches of the plurality of simulated neurons in a manner that changes the voxels occupied by the generated branches; and
updating the localized information stored in the voxels to reflect the changes in the voxels occupied by the generated branches such that, when one or more branches that occupy a particular voxel change in the particular voxel, the localized information stored in the particular voxel is updated to reflect the change in the one or more branches that occupy the particular voxel.

2. The method of claim 1 wherein:
the localized information stored in the voxels includes branch density information; and
updating the localized information stored in the voxels to reflect the changes in the voxels occupied by the generated branches comprises updating the branch density information to reflect the changes in the voxels occupied by the generated branches.

3. The method of claim 2 wherein:
generating a branch comprises:
generating a plurality of candidate segments to add to the branch,
identifying the one or more voxels that would be occupied by each candidate segment if added to the branch,
accessing the branch density information stored in the voxels that would be occupied by each candidate segment if added to the branch,
selecting one of the candidate segments to add to the branch based on the accessed branch density information, and
adding the selected candidate segment to the branch; and
updating the branch density information comprises updating the branch density information in the voxels occupied by the added segment to reflect the occupation of the voxels by the added segment.

4. The method of claim 3 wherein selecting one of the candidate segments to add to the branch comprises selecting one of the candidate segments that would occupy one of the voxels that is least densely occupied by other branches as the candidate segment to add to the branch.

5. The method of claim 1 further comprising:
generating a spatial pattern of a simulated branch attractant in the voxel space; and
storing simulated branch attractant information in the voxels, the simulated branch attractant information stored in each voxel reflecting a concentration of the simulated branch attractant in each voxel, wherein
generating a branch comprises:
generating candidate segments to add to the branch; identifying the one or more voxels that would be occupied by each candidate segment if added to the branch;
accessing the simulated branch attractant information stored in the voxels that would be occupied by each candidate voxel if added to the branch;
selecting one of the candidate segments to add to the branch based on the accessed simulated branch attractant information; and
adding the selected candidate segment to the branch.

6. The method of claim 5 wherein selecting one of the candidate segments to add to the branch comprises selecting the candidate segment that would occupy one of the voxels having the highest concentration of the simulated branch attractant as the segment to add to the branch.

7. The method of claim 1 further comprising:
generating a spatial pattern of a simulated branch repellant in the voxel space; and
storing simulated branch repellant information in the voxels, the simulated branch repellant information stored in each voxel reflecting a concentration of the simulated branch repellant in each voxel, wherein:

generating a branch comprises:
generating candidate segments to add to the branch, identifying the one or more voxels that would be occupied by each candidate segment if added to the branch,
accessing the simulated branch repellant information stored in the voxels that would be occupied by each candidate voxel if added to the branch,
selecting one of the candidate segments to add to the branch based on the accessed simulated branch repellant information, and
adding the selected candidate segment to the branch.

8. The method of claim 7 wherein selecting one of the candidate segments to add to the branch comprises selecting the candidate segment that would occupy one of the voxels having the lowest concentration of the simulated branch repellant as the segment to add to the branch.

9. The method of claim 1 further comprising:
storing neural element density information in the voxels, the neural element density information reflecting densities of different types of neural elements occupying each voxel;
generating a spatial pattern of one or more simulated chemotropic substances in the voxel space;
storing simulated chemotropic substance information in the voxels, the simulated chemotropic substance information stored in each voxel reflecting concentrations of the simulated chemotropic substances in each voxel, wherein:
the branches have affinities for the simulated chemotropic substances and different types of neural elements; and
generating a branch comprises:
generating candidate segments to add to the branch,
identifying the one or more voxels that would be occupied by each candidate segment if added to the branch,
accessing the simulated chemotropic substance information and the neural element density information stored in the voxels that would be occupied by each candidate voxel if added to the branch,
selecting one of the candidate segments to add to the branch based on the accessed simulated chemotropic substance information and the accessed neural element density information, and
adding the selected candidate segment to the branch.

10. The method of claim 9 wherein selecting one of the candidate segments to add to the branch comprises:
penalizing candidate segments that would extend into voxels occupied by neural elements for which the branch has a repulsive affinity;
penalizing candidate segments that would extend into voxels having concentrations of simulated chemotropic substances for which the branch has a repulsive affinity;
rewarding candidate segments that would extend into voxels occupied by neural elements for which the branch has an attractive affinity; and
rewarding candidate segments that would extend into voxels having concentrations of simulated chemotropic substances for which the branch has an attractive affinity.

11. The method of claim 9 wherein:
the branches of the plurality of simulated neurons comprise branches of at least two different types; and
the different types of branches have different affinities for the simulated chemotropic substances and the different types of neural elements.

12. The method of claim 1 wherein:
the one or more branches comprise input branches;
each simulated neuron of the plurality of simulated neurons has one or more output branches, each of the output branches occupying at least one of the voxels; and
the method further comprises:
generating one or more of the output branches of the plurality of simulated neurons in a manner that changes the voxels occupied by the generated output branches; and
updating the localized information stored in the voxels to reflect the changes in the voxels occupied by the generated output branches.

13. The method of claim 1 wherein embedding a plurality of simulated branched neurons in the voxel space comprises embedding a first array of simulated branched neurons having input branches in the voxel space, the method further comprising:
embedding a second array of simulated branched neurons in the voxel space, each simulated neuron of the second array having one or more output branches, each of the output branches occupying at least one of the voxels;
generating one or more of the output branches of the plurality of simulated neurons in a manner that changes the voxels occupied by the generated output branches; and
updating the localized information stored in the voxels to reflect the changes in the voxels occupied by the generated output branches.

14. A computer program for generating simulated neurons, the computer program being embodied on a tangible, computer-readable medium and including instructions that, when executed, cause a computer to:
generate a three-dimensional voxel space in which to generate a simulated neural circuit, the voxel space including a plurality of voxels that store localized information;
embed a plurality of simulated branched neurons in the voxel space, each simulated neuron having one or more branches, each of the branches occupying at least one of the voxels;
generate one or more of the branches of the plurality of simulated neurons in a manner that changes the voxels occupied by the generated branches; and
update the localized information stored in the voxels to reflect the changes in the voxels occupied by the generated branches such that, when one or more branches that occupy a particular voxel change in the particular voxel, the localized information stored in the particular voxel is updated to reflect the change in the one or more branches that occupy the particular voxel.

15. The computer program of claim 14 wherein:
the localized information stored in the voxels includes branch density information; and
the instructions that, when executed, cause a computer to update the localized information stored in the voxels to reflect the changes in the voxels occupied by the generated branches comprise instructions that, when executed, cause a computer to update the branch density information to reflect the changes in the voxels occupied by the generated branches.

16. The computer program of claim 15 wherein:
the instructions that, when executed, cause a computer to generate an branch comprise instructions that, when executed, cause a computer to:
generate a plurality of candidate segments to add to the branch,
identify the one or more voxels that would be occupied by each candidate segment if added to the branch, access the branch density information stored in the voxels that would be occupied by each candidate segment if added to the branch, select one of the candidate segments to add to the branch based on the accessed branch density information, and add the selected candidate segment to the branch; and the instructions that, when executed, cause a computer to update the branch density information comprise instructions that, when executed, cause a computer to update the branch density information in the voxels occupied by the added segment to reflect the occupation of the voxels by the added segment.

17. The computer program of claim 16 wherein the instructions that, when executed, cause a computer to select one of the candidate segments to add to the branch comprise instructions that, when executed, cause a computer to select one of the candidate segments that would occupy one of the voxels that is least densely occupied by other branches as the candidate segment to add to the branch.

18. The computer program of claim 14 further comprising instructions that, when executed, cause a computer to:

generate a spatial pattern of a simulated branch attractant in the voxel space; and store simulated branch attractant information in the voxels, the simulated branch attractant information stored in each voxel reflecting a concentration of the simulated branch attractant in each voxel, wherein:

the instructions that, when executed, cause a computer to generate a branch comprise instructions that, when executed, cause a computer to:

generate candidate segments to add to the branch;

identify the one or more voxels that would be occupied by each candidate segment if added to the branch;

access the simulated branch attractant information stored in the voxels that would be occupied by each candidate voxel if added to the branch;

select one of the candidate segments to add to the branch based on the accessed simulated branch attractant information; and add the selected candidate segment to the branch.

19. The computer program of claim 18 wherein the instructions that, when executed, cause a computer to select one of the candidate segments to add to the branch comprise instructions that, when executed, cause a computer to select the candidate segment that would occupy one of the voxels having the highest concentration of the simulated branch attractant as the segment to add to the branch.

20. The computer program of claim 14 further comprising instructions that, when executed, cause a computer to:

generate a spatial pattern of a simulated branch repellant in the voxel space; and store simulated branch repellant information in the voxels, the simulated branch repellant information stored in each voxel reflecting a concentration of the simulated branch repellant in each voxel, wherein:

the instructions that, when executed, cause a computer to generate a branch comprise instructions that, when executed, cause a computer to:

generate candidate segments to add to the branch, identify the one or more voxels that would be occupied by each candidate segment if added to the branch, access the simulated branch repellant information stored in the voxels that would be occupied by each candidate voxel if added to the branch, select one of the candidate segments to add to the branch based on the accessed simulated branch repellant information, and add the selected candidate segment to the branch.

21. The computer program of claim 20 wherein the instructions that, when executed, cause a computer to select one of the candidate segments to add to the branch comprise instructions that, when executed, cause a computer to select the candidate segment that would occupy one of the voxels having the lowest concentration of the simulated branch repellant as the segment to add to the branch.

22. The computer program of claim 14 further comprising instructions that, when executed, cause a computer to:

store neural element density information in the voxels, the neural element density information reflecting densities of different types of neural elements occupying each voxel;

generate a spatial pattern of one or more simulated chemotropic substances in the voxel space;

store simulated chemotropic substance information in the voxels, the simulated chemotropic substance information stored in each voxel reflecting concentrations of the simulated chemotropic substances in each voxel, wherein:

the branches have affinities for the simulated chemotropic substances and different types of neural elements; and the instructions that, when executed, cause a computer to generate a branch comprise instructions that, when executed, cause a computer to:

generate candidate segments to add to the branch, identify the one or more voxels that would be occupied by each candidate segment if added to the branch, access the simulated chemotropic substance information and the neural element density information stored in the voxels that would be occupied by each candidate voxel if added to the branch, select one of the candidate segments to add to the branch based on the accessed simulated chemotropic substance information and the accessed neural element density information, and add the selected candidate segment to the branch.

23. The computer program of claim 22 wherein the instructions that, when executed, cause a computer to select one of the candidate segments to add to the branch comprise instructions that, when executed, cause a computer to:

penalize candidate segments that would extend into voxels occupied by neural elements for which the branch has a repulsive affinity;

penalize candidate segments that would extend into voxels having concentrations of simulated chemotropic substances for which the branch has a repulsive affinity;

reward candidate segments that would extend into voxels occupied by neural elements for which the branch has an attractive affinity; and reward candidate segments that would extend into voxels having concentrations of simulated chemotropic substances for which the branch has an attractive affinity.

24. The computer program of claim 22 wherein:

the branches of the plurality of simulated neurons comprise branches of at least two different types; and the different types of branches have different affinities for the simulated chemotropic substances and the different types of neural elements.

25. The computer program of claim 14 wherein:
the one or more branches comprise input branches;
each simulated neuron of the plurality of simulated neurons has one or more output branches, each of the output branches occupying at least one of the voxels; and
the computer program further comprises instructions that, when executed, cause a computer to:
generate one or more of the output branches of the plurality of simulated neurons in a manner that changes the voxels occupied by the generated output branches; and
update the localized information stored in the voxels to reflect the changes in the voxels occupied by the generated output branches.

26. The computer program of claim 14 wherein the instructions that, when executed, cause a computer to embed a plurality of simulated branched neurons in the voxel space comprise instructions that, when executed, cause a computer to embed a first array of simulated branched neurons having input branches in the voxel space, the computer program further comprising instructions that, when executed, cause a computer to:
embed a second array of simulated branched neurons in the voxel space, each simulated neuron of the second array having one or more output branches, each of the output branches occupying at least one of the voxels;
generate one or more of the output branches of the plurality of simulated neurons in a manner that changes the voxels occupied by the generated output branches; and
update the localized information stored in the voxels to reflect the changes in the voxels occupied by the generated output branches.

27. A system for generating simulated neurons, the system comprising a processor configured to:
generate a three-dimensional voxel space in which to generate a simulated neural circuit, the voxel space including a plurality of voxels that store localized information;
embed a plurality of simulated branched neurons in the voxel space, each simulated neuron having one or more branches, each of the branches occupying at least one of the voxels;
generate one or more of the branches of the plurality of simulated neurons in a manner that changes the voxels occupied by the generated branches; and
update the localized information stored in the voxels to reflect the changes in the voxels occupied by the generated branches such that, when one or more branches that occupy a particular voxel change in the particular voxel, the localized information stored in the particular voxel is updated to reflect the change in the one or more branches that occupy the particular voxel.

* * * * *